United States Patent
Pham et al.

(10) Patent No.: US 12,409,809 B2
(45) Date of Patent: Sep. 9, 2025

(54) REMOTE CONTROL OF VEHICLE FEATURES BASED ON TACTILE GESTURES ON ELECTRONIC DEVICE

(71) Applicant: Honda Motor Co., Ltd., Tokyo (JP)

(72) Inventors: Richard Pham, Lakewood, CA (US); Do Hyuk Kwon, Irvine, CA (US)

(73) Assignee: Honda Motor Co., Ltd., Tokyo (JP)

( * ) Notice: Subject to any disclaimer, the term of this patent is extended or adjusted under 35 U.S.C. 154(b) by 547 days.

(21) Appl. No.: 17/681,604

(22) Filed: Feb. 25, 2022

(65) Prior Publication Data

US 2023/0271589 A1 Aug. 31, 2023

(51) Int. Cl.
*B60R 25/20* (2013.01)
*B60H 1/00* (2006.01)
(Continued)

(52) U.S. Cl.
CPC ..... *B60R 25/2045* (2013.01); *B60H 1/00657* (2013.01); *B60R 25/209* (2013.01); *E05F 15/73* (2015.01); *G06F 3/016* (2013.01); *G06F 3/017* (2013.01); *G06F 3/04817* (2013.01); *G06F 3/0482* (2013.01); *G06F 3/0484* (2013.01); *G06F 3/14* (2013.01); *B60R 2325/205* (2013.01); *E05Y 2400/45* (2013.01); *E05Y 2400/85* (2013.01); *E05Y 2400/8515* (2024.05);
(Continued)

(58) Field of Classification Search
CPC ............... B60R 25/2045; B60R 25/209; B60R 2325/205; E05F 15/73; E05Y 2400/45; E05Y 2400/85; E05Y 2900/531; E05Y 2900/55; G06F 3/016; G06F 3/017; G06F 3/04817; G06F 3/0482; G06F 3/0484; G06F 3/14
See application file for complete search history.

(56) References Cited

U.S. PATENT DOCUMENTS 10,166,948 B2  1/2019  Kang et al.
10,564,638 B1 * 2/2020  Lockwood ........... G05D 1/0027
(Continued)

FOREIGN PATENT DOCUMENTS

CN   106274807 A   1/2017
CN   105607467 B   2/2018
(Continued)

*Primary Examiner* — Anne Marie Antonucci
*Assistant Examiner* — Luis G Del Valle
(74) *Attorney, Agent, or Firm* — Suzanne Gagnon; American Honda Motor Co., Inc.

(57) ABSTRACT

An electronic device and a method for remote control of vehicle features are provided. The electronic device receives a first user input indicative of a selection of a first vehicle from a set of vehicles associated with a user. The electronic device further receives, via a haptic device associated with the electronic device, a second user input including a tactile gesture. The second user input is indicative of an instruction to remotely control a first set of features on the selected first vehicle. The tactile gesture includes a first swipe input along a first direction associated with the haptic device and further includes a second swipe input along a second direction perpendicular to the first direction. The electronic device further controls the first set of features on the selected first vehicle based on the received second user input.

19 Claims, 12 Drawing Sheets

(51) Int. Cl.
  *E05F 15/73*     (2015.01)
  *G06F 3/01*      (2006.01)
  *G06F 3/04817*   (2022.01)
  *G06F 3/0482*    (2013.01)
  *G06F 3/0484*    (2022.01)
  *G06F 3/14*      (2006.01)

(52) U.S. Cl.
  CPC ..... *E05Y 2900/531* (2013.01); *E05Y 2900/55* (2013.01)

(56) References Cited

U.S. PATENT DOCUMENTS

| | | | |
|---|---|---|---|
| 10,747,861 B2 | 8/2020 | Kim et al. | |
| 10,759,388 B2 | 9/2020 | Nelson et al. | |
| 11,029,840 B2 | 6/2021 | Tamane et al. | |
| 2011/0282537 A1* | 11/2011 | Yamasaki | G06F 3/0346 |
| | | | 701/31.4 |
| 2013/0211623 A1* | 8/2013 | Thompson | H04L 67/12 |
| | | | 701/1 |
| 2014/0005859 A1* | 1/2014 | Baskin | G07C 9/00309 |
| | | | 701/2 |
| 2014/0095031 A1* | 4/2014 | Boblett | B60G 17/015 |
| | | | 701/49 |
| 2015/0081169 A1* | 3/2015 | Pisz | G06F 21/31 |
| | | | 701/1 |
| 2015/0248214 A1* | 9/2015 | Gilger | G06T 11/206 |
| | | | 715/719 |
| 2017/0308080 A1* | 10/2017 | Brooks | A61B 5/0077 |
| 2017/0320501 A1* | 11/2017 | Li | G06F 3/04883 |
| 2019/0322176 A1* | 10/2019 | Tanaka | B60K 35/80 |
| 2019/0351872 A1 | 11/2019 | Phillips et al. | |
| 2020/0086829 A1 | 3/2020 | Wall et al. | |
| 2020/0086830 A1* | 3/2020 | Ichinose | B60R 25/246 |
| 2023/0054373 A1* | 2/2023 | Brooks | G06Q 10/06311 |

FOREIGN PATENT DOCUMENTS

| | | |
|---|---|---|
| CN | 107813787 A | 3/2018 |
| CN | 111067202 A | 4/2020 |

* cited by examiner

REMOTE CONTROL OF VEHICLE FEATURES BASED ON TACTILE GESTURES ON ELECTRONIC DEVICE

BACKGROUND

Advancements in the fields of electronics and information technology have led to development of connected vehicles that may communicate with electronic devices that may be located outside the vehicle. For example, an electronic device of a user may be wirelessly connected to the vehicle of the user through a wireless network. Through the electronic device, one or more features of the vehicle may be remotely controlled by the user. Typically, users may operate the electronic device to instruct the vehicles associated with the user to remotely control one or more features of the vehicles. However, some features of the vehicle may be critical to an operation of the vehicle and may need to be controlled carefully. In certain situations, one or more critical features of the vehicle may be accidently activated or deactivated, via the electronic device, by the user. For example, the electronic device may accidently control the vehicle to turn on an engine of the vehicle based on an input received from the user. Such erroneous control of the engine of the vehicle may be undesirable for the user as it may lead to pollution, fuel wastage, and also fines in certain cases.

Further limitations and disadvantages of conventional and traditional approaches will become apparent to one of skill in the art, through comparison of described systems with some aspects of the present disclosure, as set forth in the remainder of the present application and with reference to the drawings.

SUMMARY

According to an embodiment of the disclosure, an electronic device is provided. The electronic device may comprise a circuitry. The circuitry may be configured to receive a first user input indicative of a selection of a first vehicle from a set of vehicles associated with a user. The circuitry may be further configured to receive, via a haptic device associated with the electronic device, a second user input including a tactile gesture. For example, the second user input may be indicative of an instruction to remotely control a first set of features on the selected first vehicle. The tactile gesture may include a first swipe input along a first direction associated with the haptic device and may include a second swipe input along a second direction perpendicular to the first direction. The circuitry may be further configured to control the first set of features on the selected first vehicle based on the received second user input.

According to another embodiment of the disclosure, a method in an electronic device is provided. The method may include receiving a first user input indicative of a selection of a first vehicle from a set of vehicles associated with a user. The method may further include receiving, via a haptic device associated with the electronic device, a second user input including a tactile gesture. For example, the second user input may be indicative of an instruction to remotely control a first set of features on the selected first vehicle. The tactile gesture may include a first swipe input along a first direction associated with the haptic device and may include a second swipe input along a second direction perpendicular to the first direction. The method may further include controlling the first set of features on the selected first vehicle based on the received second user input.

According to another embodiment of the disclosure, an electronic device is provided. The electronic device may comprise circuitry. The circuitry may be configured to receive a first user input indicative of a selection of a first vehicle from a set of vehicles associated with a user. The circuitry may be further configured to control a display screen associated with the electronic device to display a first user interface (UI) indicating first information about a first set of features of the selected first vehicle. The circuitry may be further configured to receive a second user input, via the first UI, to remotely control the first set of features of the selected first vehicle. The circuitry may be further configured to receive a third user input to display second information about the first set of features controlled on a second vehicle of the set of vehicles, wherein the second vehicle is different from the first vehicle. The circuitry may be further configured to control, based on the received third user input, the display screen to display, via a second user interface (UI) different from the first UI, the second information and at least one of an icon or a highlighted portion which notify the user about the first information indicated on the first UI or about the controlled first set of features of the first vehicle.

Figure 1:
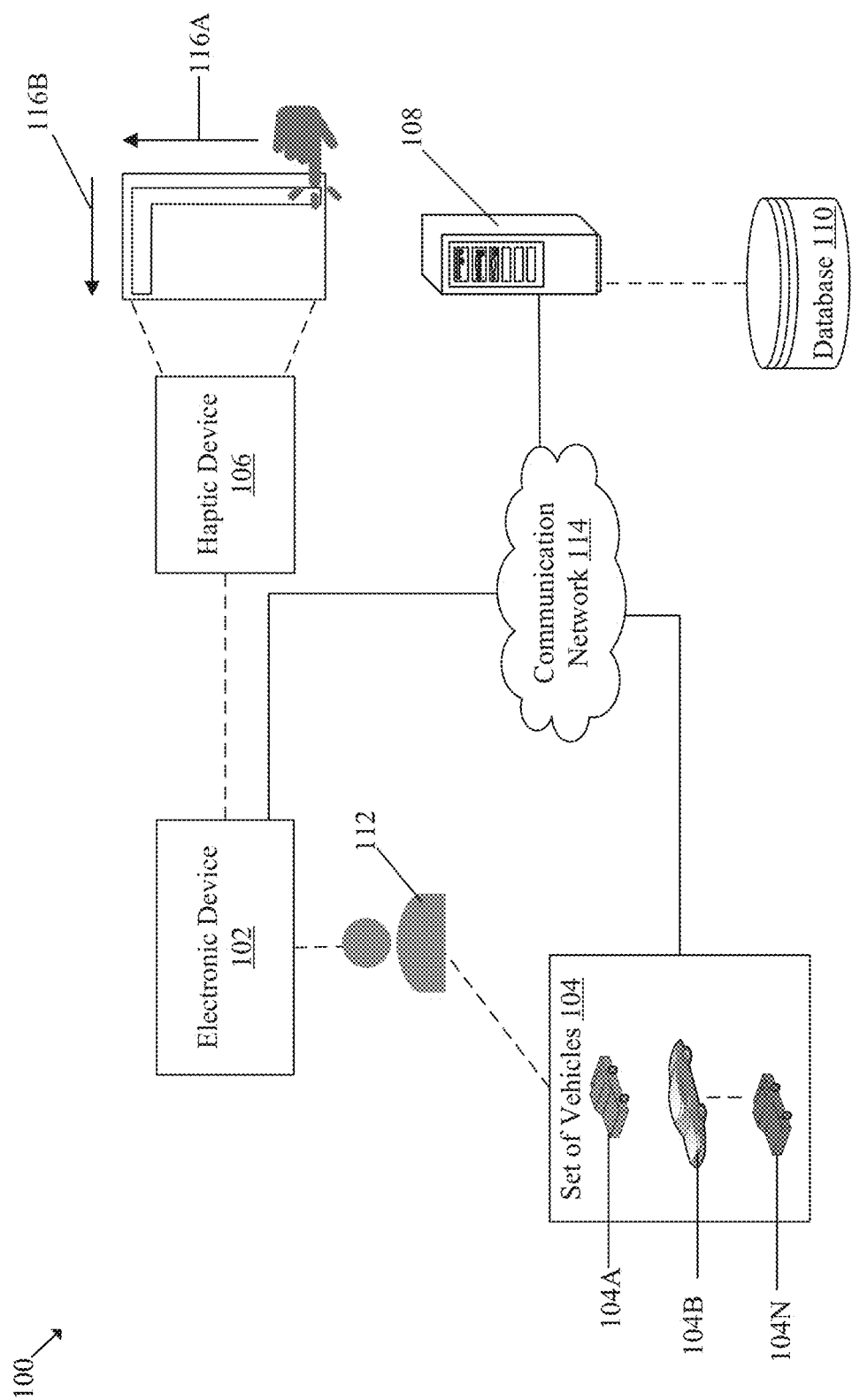
FIG. 1 is a block diagram that illustrates an exemplary network environment to remotely control features of a vehicle using an electronic device, in accordance with an embodiment of the disclosure.

The foregoing summary, as well as the following detailed description of the present disclosure, is better understood when read in conjunction with the appended drawings. For the purpose of illustrating the present disclosure, exemplary constructions of the preferred embodiment are shown in the drawings. However, the present disclosure is not limited to the specific methods and structures disclosed herein. The description of a method step or a structure referenced by a numeral in a drawing is applicable to the description of that method step or structure shown by that same numeral in any subsequent drawing herein.

DETAILED DESCRIPTION

The following described implementations may be found in an electronic device and a method for remote control of vehicle features based on tactile gestures on the electronic device. Exemplary aspects of the disclosure provide an electronic device that may comprise circuitry. The circuitry may be configured to receive a first user input indicative of a selection of a first vehicle from a set of vehicles associated with a user. The circuitry may be further configured to receive, via a haptic device associated with the electronic device, a second user input including a tactile gesture. For example, the second user input may be indicative of an instruction to remotely control a first set of features on the selected first vehicle. The first set of features may pertain to one or more critical features (of the selected first vehicle) such as, but are not limited to, an engine control feature, to activate or deactivate the engine of the selected first vehicle remote. The tactile gesture may include a first swipe input along a first direction associated with the haptic device and may include a second swipe input along a second direction, for example, perpendicular to the first direction. For example, a combination of the first swipe and the second swipe of the tactile gesture may correspond to a 'L-shaped' gesture'. The circuitry may be further configured to control the first set of features on the selected first vehicle based on the received second user input.

Typically, some critical features of a vehicle may be remotely controlled by use of a vehicle-related device of the user. Examples of such critical features may include, but are not limited to, an engine control feature to activate or deactivate an engine of the vehicle, a door control feature to lock or unlock a door of the vehicle, a window control feature to open or shut a window of the vehicle, and a heating ventilation and air-conditioning (HVAC) control feature to start or stop an HVAC of the vehicle. The critical features may be crucial for the safe operation of the vehicle. Conventional user interfaces of the vehicle-related device for control of such critical features may be difficult to use, as the conventional user interfaces may not be intuitive to a non-technical user. Also, through the conventional user interfaces, users may be prone to accidentally or unintentionally activate or deactivate the critical features of the vehicle.

On the other hand, the electronic device of the present disclosure may receive the second user input (including the tactile gesture) via the haptic device that may be associated with the electronic device. The second user input may enable intuitive remote control of critical features (e.g., the first set of features) of the selected first vehicle. A tactile gesture received through the haptic device may be more user friendly and may correspond to an intuitive mode to capture an input from a user than traditional user interface elements, as the tactile gesture may involve bodily kinesthetic skills that may be known to even non-technical users. Further, the tactile gesture may require the user to provide a predetermined pattern (e.g., an L-shaped pattern) of swipe inputs (as the tactile gesture) through the haptic device to control the critical features of the first vehicle. The use of such predetermined pattern of swipe inputs to control the critical features of the selected first vehicle may prevent accidental or inadvertent activation or deactivation of any critical feature of the selected first vehicle, thereby leading to an enhancement of a user experience of the user to remotely control vehicles.

Reference will now be made in detail to specific aspects or features, examples of which are illustrated in the accompanying drawings. Wherever possible, corresponding or similar reference numbers will be used throughout the drawings to refer to the same or corresponding parts.

FIG. 1 is a block diagram that illustrates an exemplary network environment to remotely control features of a vehicle using an electronic device, in accordance with an embodiment of the disclosure. With reference to FIG. 1, there is shown a network environment diagram 100. The network environment diagram 100 may include an electronic device 102, a set of vehicles 104, a haptic device 106, a server 108, and a database 110. For example, the set of vehicles 104 may include a first vehicle 104A, a second vehicle 104B, . . . and an Nth vehicle 104N. The number of vehicles shown in FIG. 1 is presented merely as an example. The set of vehicles 104 may include only two vehicles or more vehicles, without deviation from the scope of the disclosure. For the sake of brevity, only three vehicles have been shown in FIG. 1. However, in some embodiments, there may be more than three vehicles, without limiting the scope of the disclosure.

The electronic device 102, the set of vehicles 104, and the server 108 may be communicatively coupled to each other via a communication network 114. Further, the haptic device 106 may be external to the electronic device 102 and may be communicatively coupled to the electronic device 102. In certain scenarios, the haptic device 106 may be an in-built component of the electronic device 102. In FIG. 1, there is further shown a user 112 associated with the electronic device 102. The user 112 may perform a tactile gesture, via the haptic device 106, in a first direction 116A and in a second direction 116B that is different from the first direction 116A. In an embodiment, the second direction 116B may be, for example, perpendicular to the first direction 116A.

The electronic device 102 may include suitable logic, circuitry, interfaces, and/or code that may be configured to receive a first user input to select a first vehicle (e.g., the first vehicle 104A) from the set of vehicles 104. The electronic device 102 may be further configured to receive a second user input to remotely control a first set of features on the selected first vehicle 104A. In an embodiment, the electronic device 102 may receive the second user input, through the haptic device 106. Based on the received first user input and the second user input, the electronic device 102 may be configured to remotely control the first set of features on the selected first vehicle 104A. Examples of the electronic device 102 may include, but are not limited to, a computing device, a smartphone, a cellular phone, a mobile phone, a mainframe machine, a server, a computer work-station, a consumer electronic (CE) device, a vehicle remote controller device, a user wearable device, and/or any computing device that may be capable to remotely control one or more vehicles and may be associated with a haptic device.

Each of the set of vehicles 104 may include one or more vehicles that may be owned or used by the user 112. The term "vehicle" may refer to any moving vehicle that is capable of carrying one or more human occupants powered by any form of energy and may include cars, trucks, vans, minivans, SUVs, motorcycles, scooters, campers, boats, personal watercraft, and aircraft. The vehicle may be a non-autonomous vehicle, a semi-autonomous vehicle, or a fully autonomous vehicle, for example, as defined by National Highway Traffic Safety Administration (NHTSA). Examples of the vehicle may include, but are not limited to, a two-wheeler vehicle, a three-wheeler vehicle, a four-wheeler vehicle, a hybrid vehicle, or a vehicle with autonomous drive capability that uses one or more distinct renewable or non-renewable power sources. A vehicle that uses renewable or non-renewable power sources may include a fossil fuel-based vehicle, an electric propulsion-based vehicle, a hydrogen fuel-based vehicle, a solar-powered vehicle, and/or a vehicle powered by other forms of alternative energy sources. The vehicle may be a system through which the rider (e.g., the user 112) may travel from a start point to a destination point. Examples of the two-wheeler vehicle may include, but are not limited to, an electric two-wheeler, an internal combustion engine (ICE)-based two-wheeler, or a hybrid two-wheeler. Similarly, examples of the four-wheeler vehicle may include, but are not limited to, an electric car, an internal combustion engine (ICE)-based car, a fuel-cell based car, a solar powered-car, or a hybrid car. The present disclosure may be also applicable to other types of two-wheelers (e.g., a scooter) or four-wheelers. The description of other types of the vehicles has been omitted from the disclosure for the sake of brevity. In an embodiment, the user 112 may own more than one vehicle. Each of the set of vehicles 104 may be registered to the user 112 based on vehicle identification information associated with each vehicle. For example, the vehicle identification information of a vehicle may be transmitted from the vehicle to the electronic device 102 on the registration of the vehicle to the user 112. The electronic device 102 may store the received vehicle identification information associated with the vehicle in a memory (shown in FIG. 2) of the electronic device 102.

The haptic device 106 may include suitable logic, circuitry, interfaces, and/or code that may be configured to receive a gesture input (e.g., a swipe input) from the user 112. The haptic device 106 may be further configured to provide a haptic feedback to the user 112 on an anatomical portion (e.g., a finger) of a body of the user 112, which may be in contact with the haptic device 106. For example, the haptic feedback may be a vibratory haptic feedback on the anatomical portion. In certain cases, the haptic feedback may be provided based on a set of bio-signals associated with the anatomical portion of the body of the user 112. In an embodiment, the haptic device 106 may be configured to be worn by the user 112 and may be in contact with the anatomical portion (e.g., a finger) of the body of the user 112. In an embodiment, the wearable haptic device may include sensors, such as tactile sensors that may allow measurement of force of the human touch of the user 112 on a region of the wearable haptic device. Examples of the haptic device 106 may include, but are not limited to, a wearable garment with haptic actuators, a wearable device with haptic actuators, any device in a form of a wearable belt or medical tape/cloth with haptic actuators, a haptic touch screen, a haptic touchpad, a haptic display, or any display device that may be configured to receive a gesture input and provide a haptic feedback to a user. Examples of the wearable haptic device may include, but are not limited to, a haptic glove, a wired glove with haptic actuators, a gaming glove with haptic actuators, a wearable fingertip haptic device (such as a haptic thimble or a touch thimble), a graspable haptic device (which may generate kinesthetic sensations, such as a sensation of movement, position and force in skin, muscles, tendons, and joints of a wearer), or a wearable device (which generates tactile sensations, such as a pressure, friction, or temperature in the skin of a wearer), joysticks with haptic actuators, mouse, finger pad, robotic handle, gripper, and a humanoid robotic hand with haptic actuators. In an embodiment, the haptic device 106 may be implemented as a separate device that may be communicatively coupled to the electronic device 102, either directly (as shown in FIG. 1), or via the communication network 114. In an alternate embodiment, the haptic device 106 may be an in-built component of the electronic device 102 and may be integrated within the electronic device 102.

The server 108 may include suitable logic, circuitry, and interfaces, and/or code that may be configured to select the first vehicle 104A from the set of vehicles 104 based on the first user input received from the user 112. For example, the server 108 may receive the first user input, via the electronic device 102 and select the first vehicle 104A based on the received first user input. The server 108 may be further configured to remotely control the first set of features on the selected first vehicle 104A based on the second user input. For example, the server 108 may receive a request to control the first set of features from the electronic device 102, based on the reception of the second user input, via the electronic device 102. Based on the received request, the server 108 may transmit instructions to control the first set of features to the selected first vehicle 104A. In an embodiment, the server 108 may store information about controlled features and timestamp of the control of the set of vehicles 104. In an embodiment, the server 108 may store information about the first set of features of the set of vehicles 104 and store real-time health status information of the set of vehicles 104. The server 108 may be implemented as a cloud server and may execute operations through web applications, cloud applications, HTTP requests, repository operations, file transfer, and the like. Other example implementations of the server 108 may include, but are not limited to, a database server, a file server, a web server, a media server, an application server, a mainframe server, or a cloud computing server. In at least one embodiment, the server 108 may be implemented as a plurality of distributed cloud-based resources by use of several technologies that are well known to those ordinarily skilled in the art. A person with ordinary skill in the art will understand that the scope of the disclosure may not be limited to the implementation of the server 108 and the electronic device 102 as two separate entities. In certain embodiments, the functionalities of the server 108 can be incorporated in its entirety or at least partially in the electronic device 102, without a departure from the scope of the disclosure.

The database 110 may include suitable logic, interfaces, and/or code that may be configured to store information related to the set of vehicles 104 and instructions to control the set of vehicles 104. The database 110 may be derived from data off a relational or non-relational database, or a set of comma-separated values (csv) files in conventional or big-data storage. The database 110 may be stored or cached on a device, such as a server (e.g., the server 108) or the electronic device 102. The device storing the database 110 may be configured to receive a query for vehicle identification information or instructions associated with a set of features (e.g., the first set of features) of the set of vehicles 104 from the server 108 and/or the electronic device 102. In response, the device of the database 110 may be configured to retrieve and provide the queried vehicle identification information or instructions associated with the set of features of set of vehicles 104 to the server 108 and/or the electronic device 102 based on the received query. In some embodiments, the database 110 may be hosted on a plurality of servers stored at same or different locations. The operations of the database 110 may be executed using hardware including a processor, a microprocessor (e.g., to perform or control performance of one or more operations), a field-programmable gate array (FPGA), or an application-specific integrated circuit (ASIC). In some other instances, the database 110 may be implemented using software.

The communication network 114 may include a communication medium through which the electronic device 102, the set of vehicles 104, the haptic device 106, and the server 108 may communicate with each other. The communication network 114 may be one of a wired connection or a wireless connection. Examples of the communication network 114 may include, but are not limited to, the Internet, a cloud network, Cellular or Wireless Mobile Network (such as Long-Term Evolution and 5G New Radio), a Wireless Fidelity (Wi-Fi) network, a Personal Area Network (PAN), a Local Area Network (LAN), or a Metropolitan Area Network (MAN). Various devices in the network environment 100 may be configured to connect to the communication network 114 in accordance with various wired and wireless communication protocols. Examples of such wired and wireless communication protocols may include, but are not limited to, at least one of a Transmission Control Protocol and Internet Protocol (TCP/IP), User Datagram Protocol (UDP), Hypertext Transfer Protocol (HTTP), File Transfer Protocol (FTP), Zig Bee, EDGE, IEEE 802.11, light fidelity (Li-Fi), 802.16, IEEE 802.11s, IEEE 802.11g, multi-hop communication, wireless access point (AP), device to device communication, cellular communication protocols, and Bluetooth (BT) communication protocols.

In operation, the electronic device 102 may be configured to receive a first user input indicative of a selection of a first vehicle (e.g., the first vehicle 104A) from the set of vehicles 104 associated with the user 112. In an embodiment, the set of vehicles 104 may be registered with the electronic device 102 and/or the server 108. For example, a vehicle may be registered at a time of purchase of the vehicle, at a time prior to a use of the vehicle, or at a time prior to the reception of the first user input associated with the vehicle. In an embodiment, each of the set of vehicles 104 may be registered to the user 112 based on vehicle identification information associated with each vehicle. As an example, the vehicle identification information of the vehicle may be transmitted from the vehicle to the electronic device 102 on the registration of the vehicle for the user 112. The electronic device 102 may store the received vehicle identification information associated with the vehicle in a memory (shown in FIG. 2) of the electronic device 102. The first user input may indicate a selection of the first vehicle 104A by the user 112. In another embodiment, electronic device 102 may select the first vehicle 104A without the first user input. For example, in such case, the first vehicle 104A may correspond to a default or primary vehicle of the user 112. Alternatively, the first vehicle 104A may be selected based on a past history of selection of vehicles for control by the user 112. The selection of the first vehicle 104A from the set of vehicles 104 is described, for example, in FIG. 4A.

The electronic device 102 may be further configured to receive, via the haptic device 106 associated with the electronic device 102, a second user input including a tactile gesture. The tactile gesture may include a first swipe input along a first direction (e.g., the first direction 116A) associated with the haptic device 106 and may further include a second swipe input along a second direction (e.g., the second direction 116B) that is different from the first direction and, for example, perpendicular to the first direction. For example, the tactile gesture may include the first swipe input and the second swipe input in one of, but not limited to, an L-shape configuration, an inverted L-shape configuration, a T-shape configuration, or an inverted T-shape configuration. In an example, as shown in FIG. 1, the tactile gesture may include swipe inputs in an inverted L-shaped configuration. For instance, the tactile gesture may include the first swipe input in the first direction 116A (e.g., from a bottom-right end to a top-right end of the electronic device 102) and the second swipe input in the second direction 116B (e.g., from a top-right end to a top-left end of the electronic device 102).

The second user input may be indicative of the instruction to remotely control a first set of features on the selected first vehicle 104A. For example, the first set of features may include, but are not limited to, an engine control feature, a door control feature, or a window control feature, a luggage compartment control feature, an infotainment control feature, or a heating ventilation and air-conditioning (HVAC) system control feature, associated with the selected first vehicle 104A. In an embodiment, the first set of features may be critical features of the selected first vehicle 104A, which may be crucial for the safe operation of the selected first vehicle 104A. Thus, such features may need to be activated or deactivated with care based on the second user input.

The electronic device 102 may be further configured to control the first set of features on the selected first vehicle 104A based on the received second user input. For example, the second user input may correspond to an instruction to start an engine of the first vehicle 104A. Based on the vehicle identification information of the first vehicle 104A and the received second user input, the electronic device 102 may query the server 108 (or the database 110) for information related to the instructions to start the engine of the first vehicle 104A. Based on the query, the electronic device 102 may receive the information related to the instructions to start the engine of the first vehicle 104A from the server 108 (or the database 110). The electronic device 102 may transmit the instructions (i.e. to start the engine of the first vehicle 104A) to the first vehicle 104A, based on the information received from the server 108 (or the database 110). In an embodiment, the electronic device 102 may directly store the instructions to control the first set of features, rather than querying from the server 108 (or the database 110). The first vehicle 104A may further start the engine of the first vehicle 104A on receipt of the instructions from the electronic device 102, and thereby the electronic device 102 may control the first vehicle 104A to start the engine.

For example, the first set of features may be critical features of the selected first vehicle 104A, and hence, an accidental activation or deactivation of the first set of features has to be avoided on the first vehicle 104A. For example, a proper usage of the first set of features may be crucial for the safe operation of the first vehicle 104A. Conventional user interfaces of a vehicle-related device for control of such critical features may be difficult to use as the conventional user interfaces may not be intuitive to a non-technical user. Some conventional user interfaces may also be prone to accidental or unintentional activation or deactivation of the critical features of the vehicle. To avoid the accidental or unintentional activation or deactivation of the critical features, certain conventional user interfaces may require a user to enter a personal identification number (PIN) or a password to enable the user to control the critical features. In such case, the user may be required to remember the PIN or password and may face an inconvenience to enter the PIN or password every time a feature of the vehicle is to be controlled, which may negatively impact the user experience of the user of the vehicle.

On the other hand, the electronic device 102 of the present disclosure may receive the second user input (including the tactile gesture) via the haptic device 106 that may be associated with the electronic device 102. The second user input may enable intuitive remote control of critical features (e.g., the first set of features) of the selected first vehicle 104A. The tactile gesture received through the haptic device 106 may be a more user friendly and may correspond to an intuitive mode to capture an input from the user 112 than traditional user interface elements, as the tactile gesture indicated by the second user input may involve bodily kinesthetic skills of a person that may be known to even non-technical users. Further, the tactile gesture may correspond to a predetermined pattern (e.g., an L-shaped pattern) of swipe inputs to control the critical features of the first vehicle 104A. The use of such predetermined pattern of swipe inputs to control the critical features of the selected first vehicle 104A may prevent accidental or inadvertent activation or deactivation of any critical feature of the selected first vehicle 104A, thereby leading to an enhancement of a user experience of the user (such as the user 112).

Figure 2:
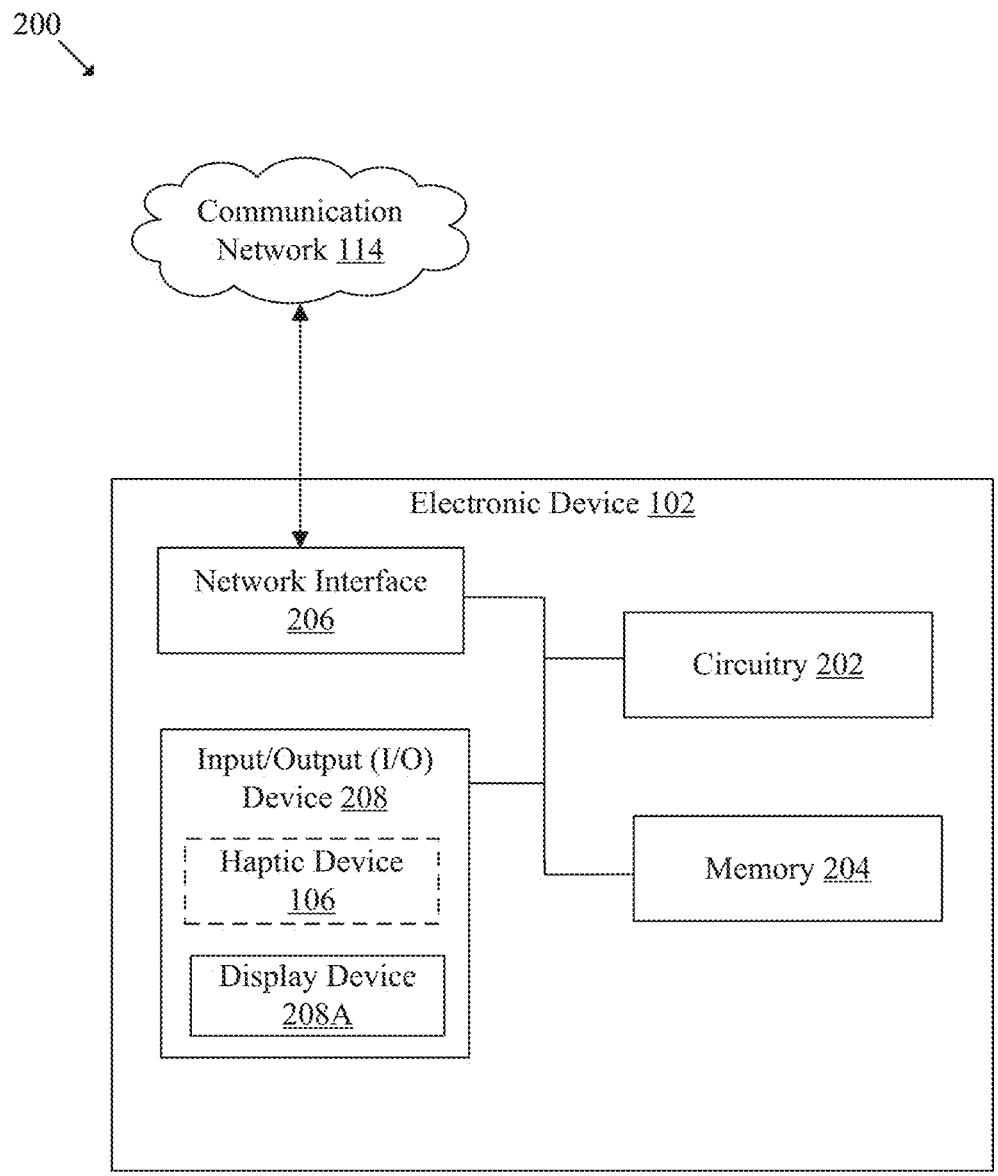
FIG. 2 is a block diagram that illustrates an exemplary electronic device of FIG. 1 to control vehicles, in accordance with an embodiment of the disclosure.

FIG. 2 is a block diagram that illustrates an exemplary electronic device of FIG. 1 to control vehicles, in accordance with an embodiment of the disclosure. FIG. 2 is explained in conjunction with elements from FIG. 1. With reference to FIG. 2, there is shown a block diagram 200 of the electronic device 102. The electronic device 102 may include circuitry 202, a memory 204, a network interface 206, and an input/output (I/O) device 208. The input output device 208 may include the haptic device 106, and a display device 208A. Although in FIG. 2, it is shown that the electronic device 102 includes the circuitry 202, the memory 204, the network interface 206, and the input/output (I/O) device 208; however, the disclosure may not be so limiting, and the electronic device 102 may include less or more components to perform the same or other functions of the electronic device 102. Details of the other functions or components have been omitted from the disclosure for the sake of brevity.

The circuitry 202 may include suitable logic, circuitry, and interfaces that may be configured to execute program instructions associated with different operations to be executed by the electronic device 102. For example, some of the operations may include reception of the first user input, reception of the second user input including the tactile gesture, and control of the first set of features on the selected first vehicle 104A. The circuitry 202 may include one or more specialized processing units, which may be implemented as a separate processor. In an embodiment, the one or more specialized processing units may be implemented as an integrated processor or a cluster of processors that perform the functions of the one or more specialized processing units, collectively. The circuitry 202 may be implemented based on a number of processor technologies known in the art. Examples of implementations of the circuitry 202 may be an X86-based processor, a Graphics Processing Unit (GPU), a Reduced Instruction Set Computing (RISC) processor, an Application-Specific Integrated Circuit (ASIC) processor, a Complex Instruction Set Computing (CISC) processor, a microcontroller, a central processing unit (CPU), and/or other control circuits.

The memory 204 may include suitable logic, circuitry, and interfaces that may be configured to store the one or more instructions to be executed by the circuitry 202. The memory 204 may be configured to store the vehicle identification information associated with the set of vehicles 104, information associated with the first set of features of a vehicle, and information associated with a second set of features of a vehicle. The memory 204 may be further configured to store health status information associated with a vehicle. Examples of implementation of the memory 204 may include, but are not limited to, Random Access Memory (RAM), Read Only Memory (ROM), Electrically Erasable Programmable Read-Only Memory (EEPROM), Hard Disk Drive (HDD), a Solid-State Drive (SSD), a CPU cache, and/or a Secure Digital (SD) card.

The network interface 206 may include suitable logic, circuitry, and interfaces that may be configured to facilitate communication between the electronic device 102, the set of vehicles 104, and the server 108, via the communication network 114. The network interface 206 may be implemented by use of various known technologies to support wired or wireless communication of the electronic device 102 with the communication network 114. The network interface 206 may include, but is not limited to, an antenna, a radio frequency (RF) transceiver, one or more amplifiers, a tuner, one or more oscillators, a digital signal processor, a coder-decoder (CODEC) chipset, a subscriber identity module (SIM) card, or a local buffer circuitry. The network interface 206 may be configured to communicate via wireless communication with networks, such as the Internet, an Intranet or a wireless network, such as a cellular telephone network, a wireless local area network (LAN), and a metropolitan area network (MAN). The wireless communication may be configured to use one or more of a plurality of communication standards, protocols and technologies, such as Global System for Mobile Communications (GSM), Enhanced Data GSM Environment (EDGE), wideband code division multiple access (W-CDMA), Long Term Evolution (LTE), 5th Generation New Radio (5G NR), code division multiple access (CDMA), time division multiple access (TDMA), Bluetooth, Wireless Fidelity (Wi-Fi) (such as IEEE 802.11a, IEEE 802.11b, IEEE 802.11g or IEEE 802.11n), voice over Internet Protocol (VoIP), light fidelity (Li-Fi), Worldwide Interoperability for Microwave Access (Wi-MAX), a protocol for email, instant messaging, and a Short Message Service (SMS).

The I/O device 208 may include suitable logic, circuitry, and interfaces that may be configured to receive an input from the user 112 and provide an output based on the received input. For example, the I/O device 208 may receive the first user input and the second user input from the user 112. Further, the I/O device 208 may provide a first user interface (UI) and a second user interface (as the output shown, for example, in FIGS. 9 and 10A-10B) for the user 112. The I/O device 208 which may include various input and output devices, may be configured to communicate with the electronic device 102 or the server 108. Examples of the I/O device 208 may include, but are not limited to, a touch screen, a keyboard, a mouse, a joystick, a microphone, a display device (e.g., the display device 208A), a haptic device (e.g., the haptic device 106), and a speaker.

The display device 208A may include suitable logic, circuitry, and interfaces that may be configured to display information about the set of vehicles 104, the first set of features, the second set of features, the health status information, the vehicle identification information, the first UI and the second UI. The display device 208A may be a touch screen which may enable the user 112 to provide a user-input, (such as the first user input, the second user input, a third user input, and a fourth user input) via the display device 208A. The touch screen may be at least one of a resistive touch screen, a capacitive touch screen, or a thermal touch screen. The display device 208A may be realized through several known technologies such as, but not limited to, at least one of a Liquid Crystal Display (LCD) display, a Light Emitting Diode (LED) display, a plasma display, or an Organic LED (OLED) display technology, or other display devices. In accordance with an embodiment, the display device 208A may refer to a display screen of a head mounted device (HMD), a smart-glass device, a see-through display, a projection-based display, an electro-chromic display, or a transparent display.

The functions or operations executed by the electronic device 102, as described in FIG. 1, may be performed by the circuitry 202. Operations executed by the circuitry 202 are described in detail, for example, in FIGS. 4A and 4B.

Figure 3:
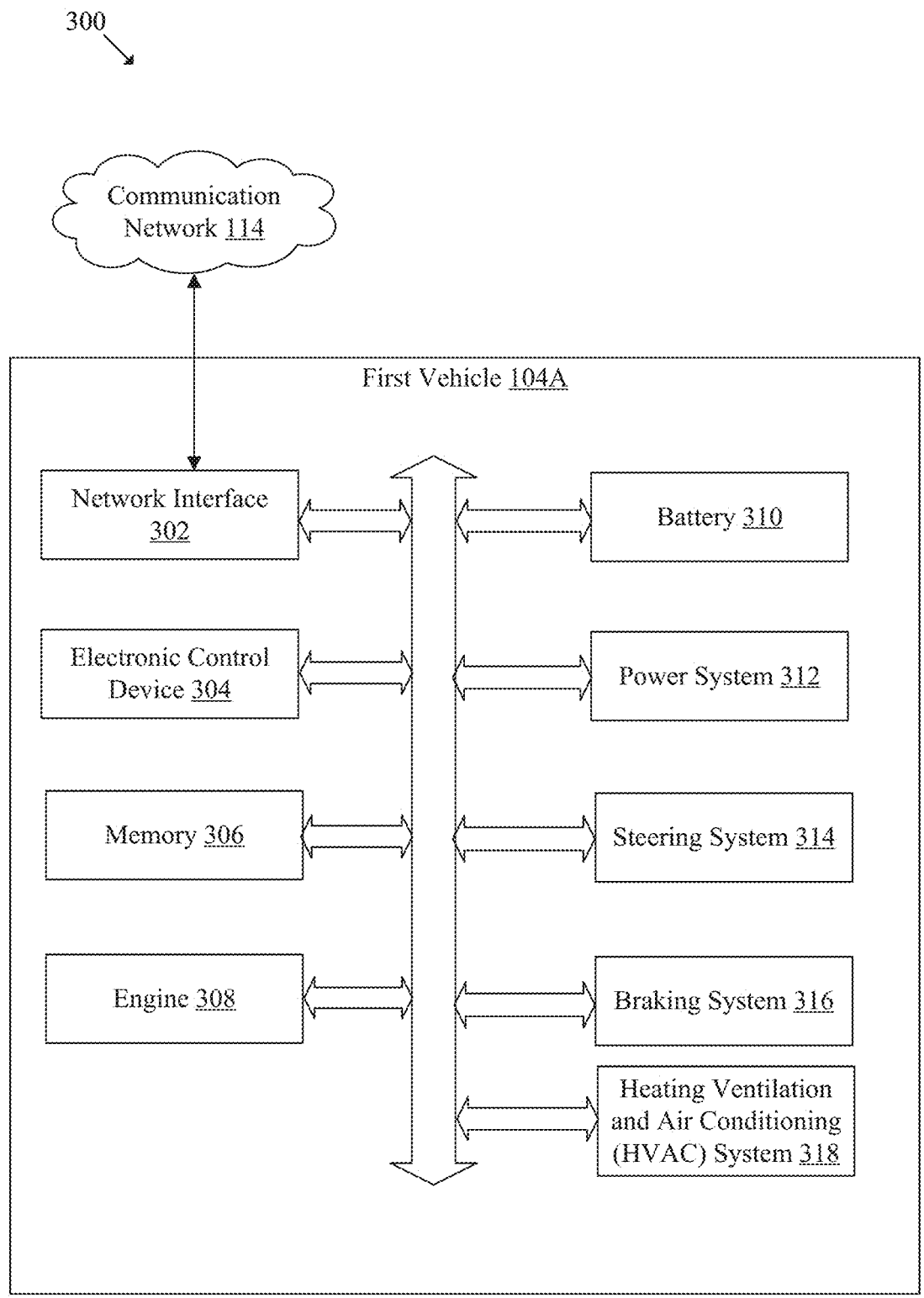
FIG. 3 is a block diagram that illustrates an exemplary first vehicle of FIG. 1, in accordance with an embodiment of the disclosure.

FIG. 3 is a block diagram that illustrates an exemplary first vehicle of FIG. 1, in accordance with an embodiment of the disclosure. FIG. 3 is explained in conjunction with elements from FIGS. 1 and 2. With reference to FIG. 3, there is shown a block diagram 300 of the first vehicle 104A. The first vehicle 104A may include a network interface 302, an electronic control device 304, a memory 306, an engine 308, a battery 310, a power system 312, a steering system 314, a braking system 316, and a heating ventilation and air-conditioning (HVAC) system 318. Although in FIG. 3, it is shown that the first vehicle 104A includes the network interface 302, the electronic control device 304, the memory 306, the engine 308, the battery 310, the power system 312, the steering system 314, the braking system 316, and the HVAC system 318; however, the disclosure may not be so limiting, and the first vehicle 104A may include less or more components to perform the same or other functions of the first vehicle 104A. Details of the other functions or components have been omitted from the disclosure for the sake of brevity.

The network interface 302 may include suitable logic, circuitry, and interfaces that may be configured to facilitate communication between the first vehicle 104A, the electronic device 102, and the server 108, via the communication network 114. The network interface 302 may be implemented by use of various known technologies to support wired or wireless communication of the first vehicle 104A with the communication network 114. The network interface 302 may include, but is not limited to, an antenna, a radio frequency (RF) transceiver, one or more amplifiers, a tuner, one or more oscillators, a digital signal processor, a coder-decoder (CODEC) chipset, a subscriber identity module (SIM) card, or a local buffer circuitry. The network interface 302 may be configured to communicate via wireless communication with networks, such as the Internet, an Intranet or a wireless network, such as a cellular telephone network, a wireless local area network (LAN), and a metropolitan area network (MAN). The wireless communication may be configured to use one or more of a plurality of communication standards, protocols and technologies, such as Global System for Mobile Communications (GSM), Enhanced Data GSM Environment (EDGE), wideband code division multiple access (W-CDMA), Long Term Evolution (LTE), 5th Generation New Radio (5G NR), code division multiple access (CDMA), time division multiple access (TDMA), Bluetooth, Wireless Fidelity (Wi-Fi) (such as IEEE 802.11a, IEEE 802.11b, IEEE 802.11g or IEEE 802.11n), voice over Internet Protocol (VoIP), light fidelity (Li-Fi), Worldwide Interoperability for Microwave Access (Wi-MAX), a protocol for email, instant messaging, and a Short Message Service (SMS).

The electronic control device 304 may include suitable logic, circuitry, interfaces, and/or code that may be configured to activate or deactivate the first set of features or a second set of features associated with the first vehicle 104A based on receipt of the second user input and a third user input, respectively from the electronic device 102. The electronic control device 304 may be a specialized electronic circuitry that may include an electronic control unit (ECU) processor to control different functions, such as, but not limited to, engine operations, communication operations, and data acquisition of the first vehicle 104A. The electronic control device 304 may control the first vehicle 104A to activate or deactivate the first set of features or the second set of features of the first vehicle 104A. The electronic control device 304 may be further configured to control a plurality of sensors (not shown) of the first vehicle 104A to measure the health status information associated with the first vehicle 104A, and further transmit the measured health status information to the electronic device 102. The electronic control device 304 may be a microprocessor. Other examples of the electronic control device 304 may include, but are not limited to, a vehicle control system, an in-vehicle infotainment (IVI) system, an in-car entertainment (ICE) system, an automotive Head-up Display (HUD), an automotive dashboard, an embedded device, a smartphone, a human-machine interface (HMI), a computer workstation, a handheld computer, a cellular/mobile phone, a portable consumer electronic (CE) device, a server, and other computing devices. The electronic control device 304 may be included or integrated in the first vehicle 104A.

The memory 306 may include suitable logic, circuitry, and interfaces that may be configured to store the one or more instructions to be executed by the first vehicle 104A. The memory 306 may be configured to store information associated with the first set of features and a second set of features associated with the first vehicle 104A. The memory 306 may be further configured to store the health status information and the vehicle identification information associated with the first vehicle 104A. Examples of implementation of the memory 306 may include, but are not limited to, Random Access Memory (RAM), Read Only Memory (ROM), Electrically Erasable Programmable Read-Only Memory (EEPROM), Hard Disk Drive (HDD), a Solid-State Drive (SSD), a CPU cache, and/or a Secure Digital (SD) card.

The engine 308 may be configured to provide power to the first vehicle 104A. The engine 308 may be an internal combustion engine with may include operations, for example, fuel injection, compression, ignition, or emission to power and drive the first vehicle 104A. The engine 308 may include various parts, for example, but are not limited to, a crankshaft, a cylinder, a spark plug, a piston, camshaft, a valve, combustion chamber, etc. In some embodiments, the engine 308 may include a motor in case of an electric motorcycle. The engine 308 may be two-stroke or four-stroke internal combustion engines. The engine 308 may include either one, two, three, four, or six cylinders. Examples of the engine 308 may include, but are not limited to, an inline engine (i.e. single cylinder, parallel twin, inline-triple, inline-four, inline-six), a V layout engine (i.e. V-twin engine, a V4 engine, a V8 engine), a flat (boxer) engine (i.e. flat-two, flat-four, flat-six), a lawn mower engine, a snow blower engine, or other motorcycle engines known in the art. A description of various parts of the engine 308 has been omitted from the disclosure for the sake of brevity.

The battery 310 may be a source of electric power for one or more electric circuits or loads (not shown) of the first vehicle 104A. For example, the battery 310 may be a source of electrical power to a control circuitry (not shown) of the first vehicle 104A, the network interface 302, the electronic control device 304, the memory 306, the engine 308, the power system 312, the steering system 314, and the braking system 316. The battery 310 may be a rechargeable battery. The battery 310 may be the source of electrical power to start the engine 308 of the first vehicle 104A. In some embodiments, the battery 310 may correspond to a battery pack, which may have a plurality of clusters of batteries, which may be surrounded by a suitable coolant and a charge controller (not shown in FIG. 3). Examples of the battery 310 may include, but are not limited to, a lead acid battery, a nickel cadmium battery, a nickel-metal hydride battery, a lithium-ion battery, and other rechargeable batteries.

The power system 312 may include suitable logic, circuitry, interfaces, and/or code that may be configured to control electric power which may be output to various electric circuits and loads of the first vehicle 104A. The power system 312 may include a battery (such as the battery 310) to provide the electric power to perform various electrical operations of the first vehicle 104A. The power system 312 may provide the electric power for functioning of different components (such as, the electronic control device 304, a communication system, the memory 306, the steering system 314, and the plurality of sensors) of the first vehicle 104A. The power system 312 may be configured to receive control signals from the electronic control device 304 of the first vehicle 104A. The power system 312 may be configured to control the charging and the discharging of the battery 310 and an auxiliary battery based on the received control signals. The power system 312 may be configured to control the transfer of the electric energy between the power system 312, the memory 306, the steering system 314, the braking system 316, and the plurality of sensors of the first vehicle 104A. Examples of the power system 312 may include, but are not limited to, an electric charge/discharge controller, a charge regulator, a battery regulator, a battery management system, an electric circuit breaker, a power electronic drive control system, an Application-Specific Integrated Circuit (ASIC) processor, and/or other energy-control hardware processors.

The steering system 314 may receive one or more control commands from the user 112. The steering system 314 may include a steering wheel/handlebar and/or an electric motor (provided for a power-assisted steering) that may be used by a driver to control movement of the first vehicle 104A in manual mode or a semi-autonomous mode. In accordance with an embodiment, the movement or steering of the first vehicle 104A may be automatically controlled when the first vehicle 104A is in autonomous mode. Examples of the steering system 314 may include, but are not limited to, an autonomous steering control, a power-assisted steering system, a vacuum/hydraulic-based steering system, an electro-hydraulic power-assisted system (EHPAS), or a "steer-by-wire" system, or an autonomous steering system, known in the art.

The braking system 316 may be used to stop or slow down the first vehicle 104A by application of resistive forces, such as electromagnetic and/or frictional forces. The braking system 316 may receive a command from a powertrain control system under the control of the control circuitry (or the electronic control device 304) when the first vehicle 104A is in an autonomous mode or a semi-autonomous mode. In accordance with an embodiment, the braking system 316 may receive a command from the control circuitry when the control circuitry (or the electronic control device 304) preemptively detects intent of the user 112 to perform a specific task which requires the user 112 to apply brakes.

The HVAC system 318 may include a heating system, a ventilation system, an air-conditioning system, and/or a thermostat system that may be configured to maintain a temperature, an air flow, and/or a humidity level of air inside a cabin (not shown) of the first vehicle 104A. The HVAC system 318 may include a set of adjustable air vents that may be servo-controlled (e.g., controlled by one or more servo motors). The set of adjustable air vents may circulate air at a certain temperature, humidity, and pressure into the cabin of the first vehicle 104A to maintain the temperature, air flow, and/or humidity level of the air inside the cabin of the first vehicle 104A.

Figure 4A:
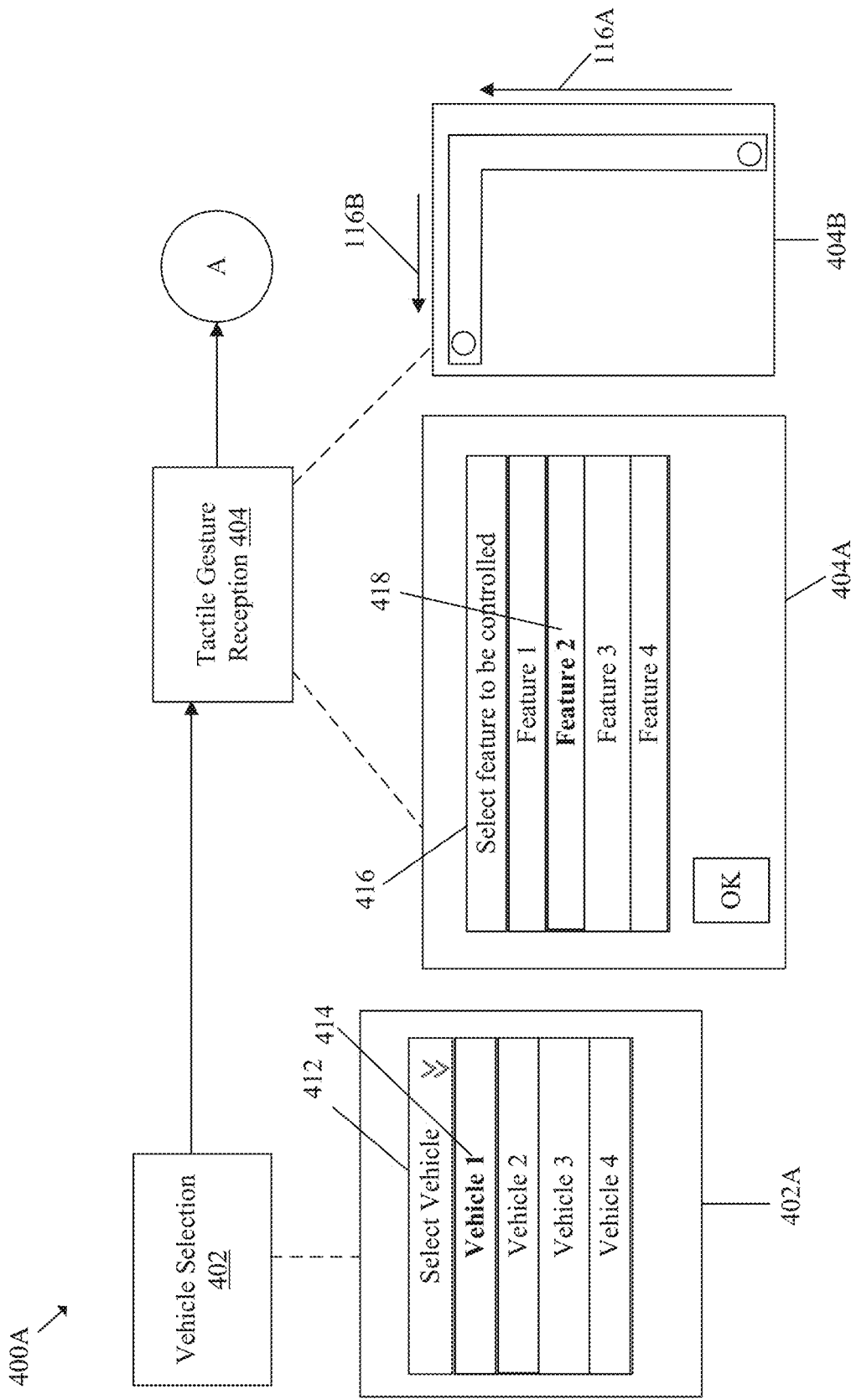
FIGS. 4A and 4B is a diagram that collectively illustrate an execution scenario to control a first vehicle by use of the electronic device of FIG. 1, in accordance with an embodiment of the disclosure.
Figure 4B:
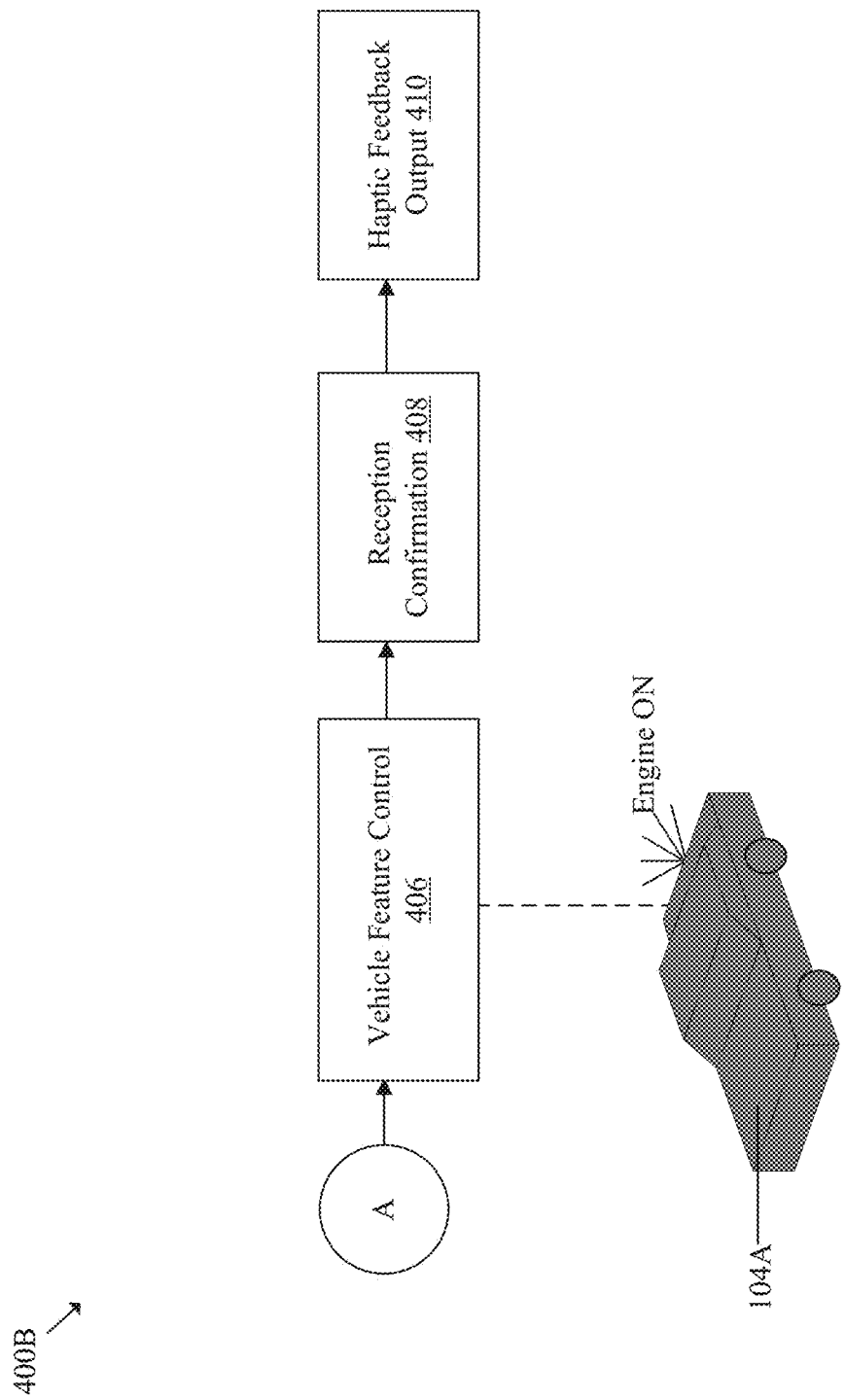

FIGS. 4A and 4B are diagrams that collectively illustrate an execution scenario to control a first vehicle by use of the electronic device of FIG. 1, in accordance with an embodiment of the disclosure. FIGS. 4A and 4B are explained in conjunction with elements from FIGS. 1, 2 and 3. With reference to FIGS. 4A and 4B, there is shown an execution scenario 400A-400B of exemplary operations from 402 to 410 that may be executed by the circuitry 202 of the electronic device 102.

At 402, a vehicle selection operation may be executed. In the vehicle selection operation, the circuitry 202 may be configured to receive from the user 112, the first user input indicative of the selection of the first vehicle (e.g., the first vehicle 104A) from the set of vehicles 104 associated with the user 112. Based on the reception of the first user input from the user 112, the circuitry 202 may select the first vehicle 104A from the set of vehicles 104. In an example, the first vehicle 104A may be selected by using an auto populate user interface element (for example rendered on the display device 208A). For example, the circuitry 202 of the electronic device 102 may receive one or more characters associated with a name of a vehicle (for example a model name) from the user 112 as the first user input. The circuitry 202 may select the first vehicle 104A based on the received one or more characters about the first vehicle 104A. In another example, the circuitry 202 may present a user interface 402A on the display device 208A to receive the first user input indicative of the selection of the first vehicle 104A. The user interface 402A may include, for example, a dropdown menu 412 that may include names or the vehicle identification information of each of the set of vehicles 104 as items of the dropdown menu 412. For example, the dropdown menu 412 may include vehicle names, such as, "Vehicle 1", "Vehicle 2", "Vehicle 3", and "Vehicle 4" as shown in FIG. 4A. The circuitry 202 may receive the first user input based on selection of an item from the dropdown menu 412. For example, as shown in FIG. 4A, the circuitry 202 may receive a user input indicative of a selection of a first item 414 (such as, the "Vehicle 1") as the first user input.

Based on the selection of the first item 414 (such as, the "Vehicle 1"), the first vehicle 104A may be selected. The selection of the first vehicle 104A by use of the dropdown menu 412 in FIG. 4A is for exemplary purposes and should not be construed to limit the scope of the disclosure. The first vehicle 104A may be selected using various other user interface elements and/or using different selection techniques (e.g., a random selection, or an automatic selection by the circuitry 202 based on past vehicle selection history of the user 112 or other users associated with the user 112), without departure from the scope of the disclosure.

At 404, a tactile gesture reception operation may be executed. In the tactile gesture reception operation, the circuitry 202 may be configured to receive the second user input including the tactile gesture. The second user input may be indicative of the instruction to remotely control the first set of features on the selected first vehicle 104A. The first set of features may be critical features of the selected first vehicle 104A that may be remotely controlled.

In an embodiment, the first set of features of the selected first vehicle 104A may correspond to at least one of, but are not limited to, an engine control feature, a door control feature, or a window control feature, a luggage compartment control feature, an infotainment control feature, or a heating ventilation and air-conditioning (HVAC) system control feature, associated with the selected first vehicle 104A. The engine control feature may be selected to activate or deactivate the engine of the selected first vehicle 104A based on the tactile gesture. For example, the engine control feature may be used in a cold region to remotely start the engine (say in advance) and warm the engine of the selected first vehicle 104A before the user 112 rides the first vehicle 104A. The door control feature may be used to remotely open or close one or more doors of the selected first vehicle 104A to enable another person to wait inside the selected first vehicle 104A until the user 112 arrives at a location of the first vehicle 104A. The window control feature may be used to remotely open or close one or more windows of the selected first vehicle 104A (for example to enable ventilation of the first vehicle 104A before the user 112 rides). The luggage compartment control feature may be used to remotely open or close the luggage compartment of the first vehicle 104A to enable loading of luggage to or unloading of luggage from the first vehicle 104A by a person (e.g., a porter or the user 112). The infotainment control feature may be used to remotely activate or deactivate an infotainment system of the first vehicle 104A for individuals seated in the first vehicle 104A. The heating ventilation and air-conditioning (HVAC) system control feature may be used to increase or decrease a temperature of the cabin of the first vehicle 104A. For example, the HVAC system control feature may be used in summer season to cool the cabin of the selected first vehicle 104A before the user 112 rides the selected first vehicle 104A. Alternatively, the HVAC system control feature may be used in winter season to warm the cabin of the selected first vehicle 104A before the user 112 rides the selected first vehicle 104A. In another example, the HVAC system control feature may be used to cool or warm the cabin of the first vehicle 104A for individuals who may be present in the first vehicle 104A.

In an embodiment, one or more features of the first set of features may be remotely controlled based on the received second user input. The circuitry 202 may present a user interface 404A on the display device 208A to enable the selection of the one or more features to be controlled. The user interface 402A may include, for example, a dropdown menu 416 including the first set of features. For example, as shown in FIG. 4A, the first set of features in the dropdown menu 416 may include "Feature 1", "Feature 2", "Feature 3", and "Feature 4". The circuitry 202 may receive a user input (i.e., second user input) indicative of a selection of one or more features (that are to be controlled) of the first set of features from the dropdown menu 416. For example, as shown in FIG. 4A, the circuitry 202 may receive the user input indicative of a selection of a second item 418 (such as, the "Feature 2") as the selected one or more features to be remotely controlled. Based on the selection of the second item 418 (such as, the "Feature 2"), the feature, such as, the engine control feature of the first vehicle 104A, may be selected. The selection of the engine control feature by use of the dropdown menu 416 in FIG. 4A is for exemplary purposes and should not be construed to limit the scope of the disclosure. The engine control feature or any other feature of the first set of features may be selected using various other user interface elements or using selection techniques (e.g., an automatic selection by the circuitry 202 based on past feature selection history of the user 112 or other users associated with the user 112), without departure from the scope of the disclosure.

In an embodiment, the circuitry 202 may be further configured to control the display device 208A to display a user interface 404B with a displayed pattern and to receive the tactile gesture as the second user input along the displayed pattern. The tactile gesture may include the first swipe input and the second swipe input. The circuitry 202 may receive the first swipe input, via the haptic device 106, that may include a swipe input of the user 112 (using an anatomic region of the user 112, such as, a finger, e.g., a forefinger) in the first direction 116A. For example, the first direction 116A may correspond to a direction that may be parallel to a first edge of the haptic device 106 as shown, for example, in FIG. 4A. For example, the first swipe input may be a swipe input of the user 112 from a bottom-right end to a top-right end of the haptic device 106. The circuitry 202 may further receive the second swipe input, via the haptic device 106, that may include a swipe input of the user 112 (using the anatomic region of the user 112, such as, the forefinger) in the second direction 1166 that may be perpendicular to the first direction 116A. For example, the second direction 116B may correspond to a direction that may be parallel to a second edge of the haptic device 106, wherein the second edge may be perpendicular to the first edge of the haptic device 106. For example, the second swipe input may be a swipe input of the user 112 from a top-right end to a top-left end of the haptic device 106. As an example, the tactile gesture may be in various shaped swipe configurations such as, an L-shaped swipe configuration, a vertically inverted L-shaped swipe configuration (as shown in FIG. 4A for example), a horizontally inverted L-shaped swipe configuration a T-shaped swipe configuration, or an inverted T-shaped swipe configuration. The tactile gesture may include a predetermined pattern of swipe inputs that may be displayed on the display device 208A, which may be a non-trivial user-input for the user 112 and may require some effort on part of the user 112. Thus, the use of the tactile gestures (i.e., including the first swipe input in a direction perpendicular to a direction of the second swipe input) to control the first set of features may reduce a likelihood of an accidental or unintentional activation or deactivation of the first set of features, as compared to conventional user interface inputs. In some embodiments, the user 112 may define different tactile gestures for different set of features to be controlled on the first vehicle 104A. For example, the L-shaped swipe gesture may be defined for the door lock/unlock, a vertically inverted L-shaped swipe gesture may be defined for engine start/stop, T-shaped swipe gesture may be defined for window open/close and so on.

At 406, a feature control operation of a vehicle may be executed. In the feature control operation of the vehicle, the circuitry 202 may remotely control the first set of features on the selected first vehicle 104A based on the received second user input including the tactile gesture. For example, the second user input may correspond to an instruction to start an engine of the first vehicle 104A. Based on the vehicle identification information of the first vehicle 104A and the received second user input, the circuitry 202 may query the server 108 (or the database 110) for information related to the instructions to start the engine of the first vehicle 104A. Based on the query, the circuitry 202 may receive the information (such as one or more wireless commands), related to the instructions to start the engine of the first vehicle 104A, from the server 108 (or the database 110). The circuitry 202 may further transmit the instructions to start the engine of the first vehicle 104A to the first vehicle 104A, based on the information received from the server 108 (or the database 110). In some embodiments, the electronic device 102 may store different instructions related to the first set of features (i.e., related to the first vehicle 104A) in the memory 204 and may not query the server 108 (or the database 110). In such case, the circuitry 202 may retrieve the corresponding instructions to control one of the first set of features from the memory 204, based on the received second user input. The first vehicle 104A may further start the engine of the first vehicle 104A on receipt of the instructions from the circuitry 202, and thereby the circuitry 202 may remotely control the first vehicle 104A to start the engine (as shown in FIG. 4B). In some embodiment, the circuitry 202 may control the display device 208A to show one or more icons (shown, for example, in FIGS. 5-7 and 10A-10B) indicating to the user 112 that the selected feature is being controlled on the selected first vehicle 104A. For example, the icon may indicate that the engine of the first vehicle 104A is now stared, or a door of the first vehicle 104A is unlocked (or locked) based on the control performed as per the second user input, by the disclosed electronic device 102. In further embodiment, the icon may further indicate a time period (in seconds or minutes) taken to completely control the selected feature, for example, 10 seconds to be taken to start the engine of the first vehicle 104A. The circuitry 202 may further control a countdown timer (as further described in FIGS. 5-6) to indicate a remaining time (i.e. out of the total time period) to complete the control of the selected feature. The remaining time for the completion of the control of the selected feature (for example door unlock or engine start) may be indicated by a user interface element (not shown), for example, a progress bar.

In an embodiment, the circuitry 202 may be further configured to receive from the selected first vehicle 104A, a confirmation (as described at 408) indicative of the control of the first set of features (e.g., an enablement or starting of an engine) on the selected first vehicle 104A, based on the received second user input. The circuitry 202 may be further configured to control the haptic device 106 associated with the electronic device 102 to output haptic feedback (as described at 410), based on the received confirmation.

At 408, a reception confirmation operation may be executed. In the reception confirmation operation, the circuitry 202 may be configured to receive from the electronic control device 304 of the selected first vehicle 104A, confirmation information (i.e. related to a confirmation) indicative of the reception of the instructions to control the first set of features at the selected first vehicle 104A. For example, once the selected first vehicle 104A receives the instructions for the control of the first set of features on the selected first vehicle 104A from the electronic device 102, the selected first vehicle 104A may control the first set of features (i.e., engine start) based on the instructions. Further, the selected first vehicle 104A may transmit to the electronic device 102, the confirmation indicative of the reception of the instructions from the electronic device 102. The circuitry 202 may receive the confirmation transmitted by the selected first vehicle 104A.

At 410, a haptic feedback output operation may be executed. In the haptic feedback output operation, the circuitry 202 may be configured to control the haptic device 106 associated with the electronic device 102 to output a haptic feedback, based on the received confirmation. The haptic feedback may provide an indication to the user 112 that the first set of features have been controlled on the selected first vehicle 104A. In an embodiment, feedback (such as visual feedback) may be provided based on a blinking of the display device 208A or light emitting diodes (LEDs) associated with the electronic device 102 to inform the user 112 that the first set of features have been controlled on the selected first vehicle 104A. In another embodiment, the feedback may be provided as a notification, or a message displayed on the display device 208A. The notification or message may indicate that the first set of features have been controlled on the selected first vehicle 104A based on the second user input provided by the user 112 (for example using the L-shape gesture as shown in FIG. 4A). In another embodiment, the haptic feedback may be provided as a vibration and/or as an audio output associated with the haptic device 106. For example, the haptic device 106 may vibrate for a certain time period (e.g., 10 seconds). Further, an audio notification may also be output through the haptic device 106 (or via an audio generating component, such as a speaker inbuilt in the electronic device 102) to indicate the control of the first set of features on the selected first vehicle 104A.

In an embodiment, the electronic device 102 or the haptic device 106 may be a user wearable device. The user wearable device may be worn by the user 112 associated with the electronic device 102 to remotely control the selected first vehicle 104A. Example of the user wearable device may include a head band, a wrist band, a head-mounted device, a smart watch, and the like. The use of the user wearable device as the electronic device 102 may facilitate the user 112 to easily carry the electronic device 102 and/or the haptic device 106 to remotely control the set of vehicles 104, without a worry for misplacing the electronic device 102 and/or the haptic device 106.

Figure 5:
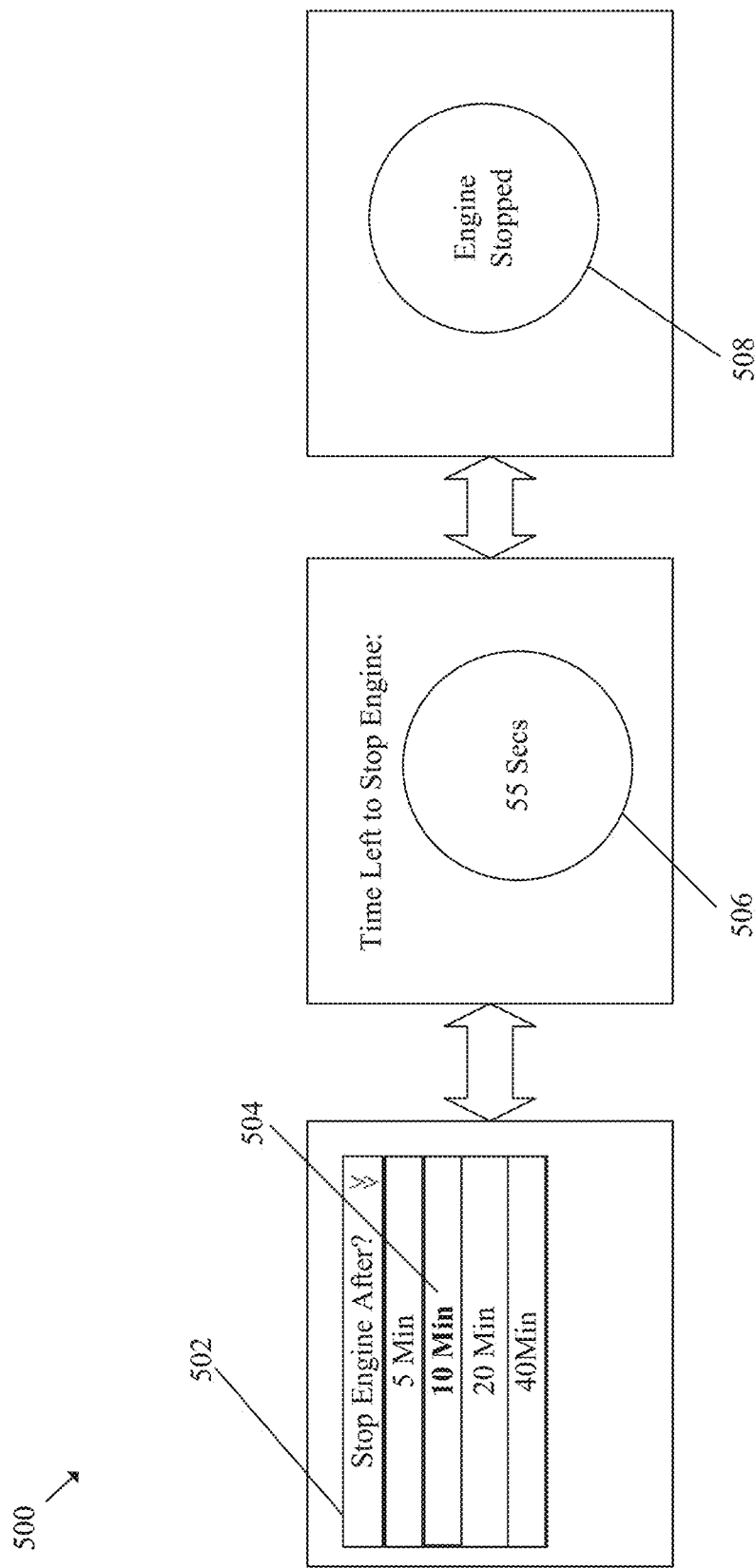
FIG. 5 is a diagram that illustrates an exemplary scenario of a user interface of the electronic device of FIG. 1 to stop a started engine of a first vehicle, in accordance with an embodiment of the disclosure.

FIG. 5 is a diagram that illustrates an exemplary scenario of a user interface of the electronic device of FIG. 1 to stop a started engine of a first vehicle. FIG. 5 is explained in conjunction with elements from FIGS. 1, 2, 3, 4A, and 4B. With reference to FIG. 5, there is shown an exemplary scenario of a user interface (UI) 500. The UI 500 may include a set of UI elements including a first UI element 502, a second UI element 504, a third UI element 506, and a fourth UI element 508. The circuitry 202 may be configured to control the display device 208A to display the UI 500 including the set of UI elements. A set of operations associated with the exemplary scenario is described herein.

In an embodiment, the circuitry 202 may be configured to receive a third user input indicative of a time duration after which a started engine (e.g., the engine 308) of the selected first vehicle (e.g., the first vehicle 104A) is to be stopped. The circuitry 202 may be further configured to control the selected first vehicle 104A to stop the started engine 308 of the selected first vehicle 104A, based on the received third user input. The third user input may be received in several ways. In an example, the circuitry 202 may enable the user 112 to provide a swipe input through the UI 500 on the display device 208A such that the swipe input may correspond to the third user input. In another example, the circuitry 202 may present a UI element on the display device 208A that may accept a tap input from the user 112 as the third user input. For example, as shown in FIG. 5, the circuitry 202 may present the first UI element 502 (such as, a dropdown menu list) though the display device 208A to the user 112. The first UI element 502 may include a plurality of items, each of which may indicate a certain time interval after which the engine 308 is to be stopped. For example, the first UI element 502 may include time interval options, such as, "5 minutes", "10 minutes", "20 minutes", and "40 minutes". The circuitry 202 may receive the third user input as a selection of one of the items of the first UI element 502. For example, the circuitry 202 may receive a selection of the second UI element 504 (e.g., an item that may correspond to a time interval of "10 minutes") from the user 112. In such case, the time interval of "10 minutes" may be selected as a time interval after which the started engine 308 of the selected vehicle 104A is to be stopped. In another example, the circuitry 202 may receive the third user input as a tactile gesture from the user 112 through at least one of the haptic device 106 and/or the display device 208A. The third user input may indicate the time duration after which the started engine 308 of the selected first vehicle 104A may be stopped.

Once the third user input is received, the circuitry 202 may be configured to start a countdown timer based on the time interval indicated in the third user input. For example, in case the time interval of "10 minutes" is selected through the second UI element 504, the countdown timer may start from "10 minutes". As shown in FIG. 5, there is shown an exemplary user interface element, such as, the third UI element 506 that may present the current time left (e.g., "55 seconds") for expiration of the started countdown timer. In an embodiment, the circuitry 202 may receive, through the third UI element 506, a user input to reset the time interval of the countdown timer to the initially set value (e.g., "10 minutes" as the third user input). For example, the circuitry 202 may receive a single tap user input through the third UI element 506 from the user 112. The single tap user input may be the user input to reset the time interval of the countdown timer to the initially set value. In an embodiment, the circuitry 202 may receive, through the third UI element 506, a user input to pause the countdown timer to a current value (e.g., "55 seconds"). For example, the circuitry 202 may receive a first double tap user input through the third UI element 506 from the user 112 to pause the countdown timer to the current value. Further, through the third UI element 506, the circuitry 202 may receive another user input to resume the paused countdown time, in case the countdown timer is paused. For example, the circuitry 202 may receive a second double tap user input through the third UI element 506 from the user 112. The second double tap user input may be received after the first double tap user input. Based on the receipt of the second double tap user input, the circuitry 202 may resume the paused countdown timer. For example, the countdown timer may resume from the current value. In an embodiment, during the operation of the countdown timer, the circuitry 202 may receive a user input from the user 112 to edit the time interval of the countdown timer (for example increase or decrease of certain seconds/minutes in the time duration indicated by the third user input). Once the countdown timer expires (i.e., reaches zero value), the circuitry 202 may be configured to remotely control the selected first vehicle 104A to stop the started engine 308 of the selected first vehicle 104A. For example, once the engine 308 is stopped on the selected first vehicle 104A, the circuitry 202 may further control the display device 208A to render the fourth UI element 508 indicative of a status of the engine 308 (i.e., "Engine Stopped"). It should be noted that the UI 500 of FIG. 5 is for exemplary purposes and should not be construed to limit the scope of the disclosure.

Figure 6:
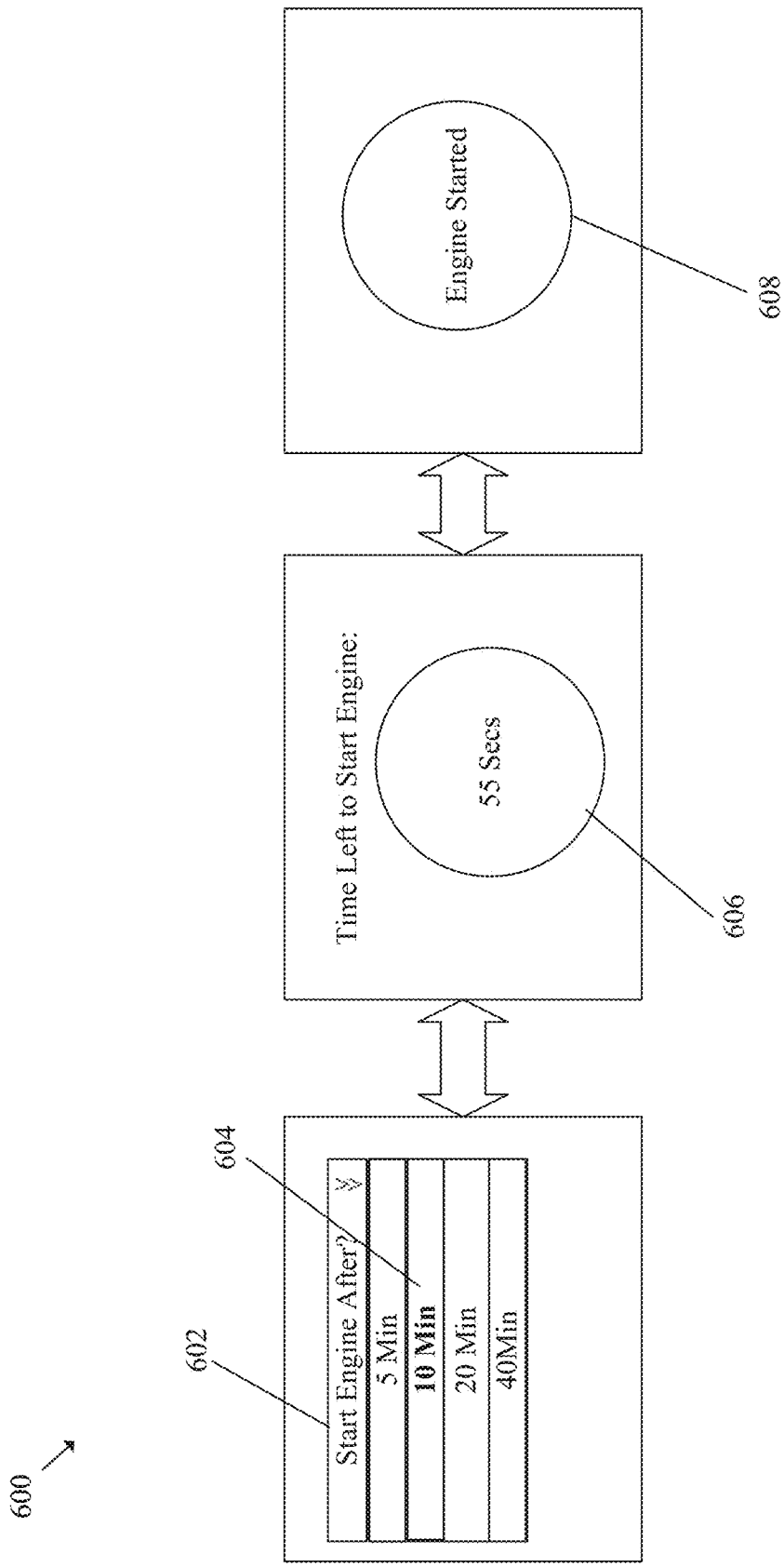
FIG. 6 is a diagram that illustrates an exemplary scenario of a user interface of the electronic device of FIG. 1 to start a stopped engine of a first vehicle, in accordance with an embodiment of the disclosure.

FIG. 6 is a diagram that illustrates an exemplary scenario of a user interface of the electronic device of FIG. 1 to start a stopped engine of a first vehicle. FIG. 6 is explained in conjunction with elements from FIGS. 1, 2, 3, 4A, 4B, and 5. With reference to FIG. 6, there is shown an exemplary scenario of a user interface (UI) 600. The UI 600 may include a set of UI elements including a first UI element 602, a second UI element 604, a third UI element 606, and a fourth UI element 608. The circuitry 202 may be configured to control the display device 208A of the electronic device 102 to display the UI 600 including the set of UI elements. A set of operations associated with the exemplary scenario is described herein.

In an embodiment, the circuitry 202 may be configured to receive a third user input indicative of a time duration after which a stopped engine (e.g., the engine 308) of the selected first vehicle 104A is to be started. The circuitry 202 may be further configured to control the selected first vehicle 104A to start the stopped engine 308 of the selected first vehicle 104A based on the received third user input. In an example, the circuitry 202 may enable the user 112 to provide a swipe input through the UI 600 on the display device 208A such that the swipe input may correspond to the third user input. In another example, the circuitry 202 may present a UI element on the display device 208A that may accept a tap input from the user 112 as the third user input. For example, as shown in FIG. 6, the circuitry 202 may present the first UI element 602 (such as, a dropdown menu list) though the display device 208A to the user 112. The first UI element 602 may include a plurality of items, each of which may indicate a certain time interval after which the engine 308 is to be started. For example, the first UI element 602 may include time interval options, such as, "5 minutes", "10 minutes", "20 minutes", and "40 minutes". The circuitry 202 may receive the third user input as a selection of one of the items of the first UI element 602. For example, the circuitry 202 may receive a selection of the second UI element 604 (e.g., an item that may correspond to a time interval of "10 minutes") from the user 112. In such case, the time interval of "10 minutes" may be selected as a time interval after which the stopped engine 308 of the selected vehicle 104A is to be started. In another example, the circuitry 202 may receive the third user input as a tactile gesture from the user 112 through at least one of the haptic device 106 and/or the display device 208A. The third user input may provide the time duration after which the stopped engine 308 of the selected first vehicle 104A may be started. For example, in areas where temperature is considerably low (e.g., less than 0 degrees Celsius), the engine oil of the first vehicle 104A may thicken, and the engine 308 may need to be turned on to warm up the engine 308 before the user 112 rides the first vehicle 104A. Thus, to warm up the engine 308 prior to a start of a journey of the first vehicle 104A, the engine 308 of the first vehicle 104A may be required to be started at a certain time before the user 112 rides the first vehicle 104A.

Once the third user input is received, the circuitry 202 may be configured to start a countdown timer based on the time interval indicated in the third user input. For example, in case the time interval of "10 minutes" is selected through the second UI element 604, the countdown timer may start from "10 minutes". As shown in FIG. 6, there is shown an exemplary user interface element, such as, the third UI element 606 that may present the current time left (e.g., "55 seconds") for expiration of the started countdown timer. In an embodiment, the circuitry 202 may receive, through the third UI element 606, a user input to reset the time interval of the countdown timer to the initially set value (e.g., "10 minutes" as the third user input). For example, the circuitry 202 may receive a single tap user input through the third UI element 606 from the user 112. The single tap user input may be the user input to reset the time interval of the countdown timer to the initially set value of. In an embodiment, the circuitry 202 may receive, through the third UI element 606, a user input to pause the countdown timer to a current value (e.g., "55 seconds"). For example, the circuitry 202 may receive a first double tap user input through the third UI element 606 from the user 112 to pause the countdown timer to the current value. Further, through the third UI element 606, the circuitry 202 may receive another user input to resume the paused countdown time. For example, the circuitry 202 may receive a second double tap user input through the third UI element 606 from the user 112 to resume the paused countdown timer. Once the countdown timer expires (i.e., reaches zero value), the circuitry 202 may be configured to remotely control the selected first vehicle 104A to start the stopped engine 308 of the selected first vehicle 104A. For example, once the engine 308 is started on the selected first vehicle 104A, the circuitry 202 may further control the display device 208A to render the fourth UI element 608 indicative of a status of the engine (i.e., "Engine Started"). It should be noted that the UI 600 of FIG. 6 is for exemplary purposes and should not be construed to limit the scope of the disclosure.

Figure 7:
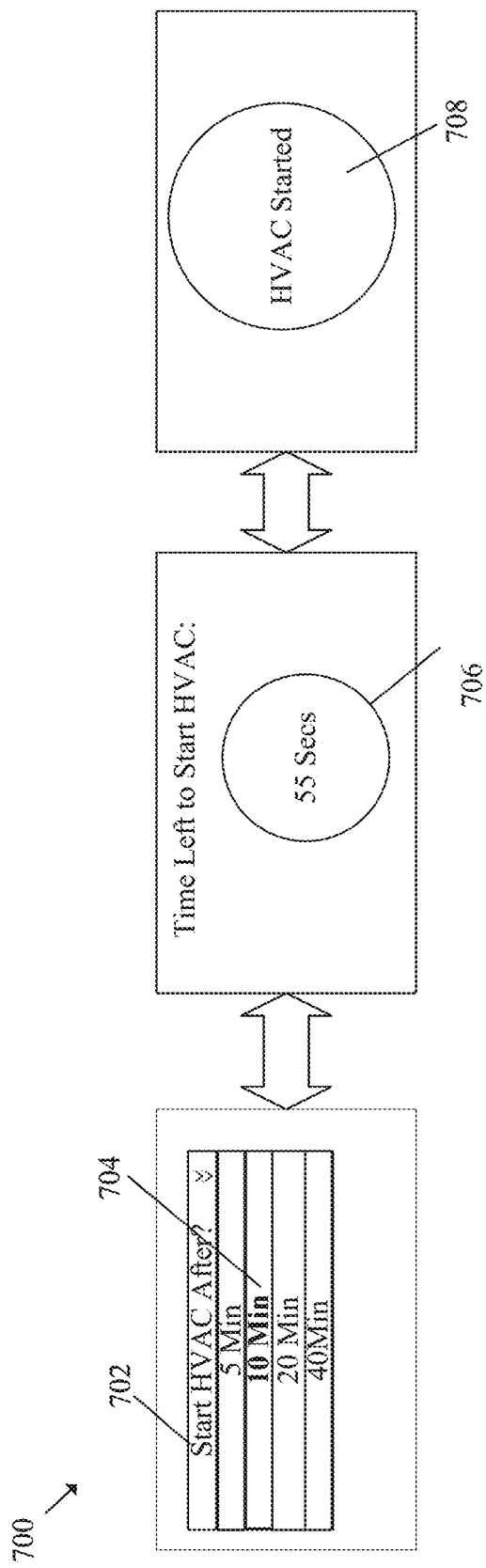
FIG. 7 is a diagram that illustrates an exemplary scenario of a user interface of the electronic device of FIG. 1 to start a stopped heating ventilation and air-conditioning (HVAC) system of a first vehicle, in accordance with an embodiment of the disclosure.

FIG. 7 is a diagram that illustrates an exemplary scenario of a user interface of the electronic device of FIG. 1 to start a stopped heating ventilation and air-condition (HVAC) system of a first vehicle, in accordance with an embodiment of the disclosure. FIG. 7 is explained in conjunction with elements from FIGS. 1, 2, 3, 4A, 4B, 5, and 6. With reference to FIG. 7, there is shown an exemplary scenario of a user interface (UI) 700. The UI 700 may include a set of UI elements including a first UI element 702, a second UI element 704, a third UI element 706, and a fourth UI element 708. The circuitry 202 may be configured to control the display device 208A of the electronic device 102 to display the UI 700 including the set of UI elements. A set of operations associated with the exemplary scenario is described herein.

In an embodiment, the circuitry 202 is further configured to receive a third user input indicative of a time duration after which a stopped HVAC system (e.g., the HVAC system 318) of the selected first vehicle 104A is to be started. The circuitry 202 is further configured to remotely control the selected first vehicle 104A to start the stopped HVAC 318 system of the selected first vehicle 104A, based on the received third user input. In an example, the circuitry 202 may enable the user 112 to provide a swipe input through the UI 700 on the display device 208A such that the swipe input may correspond to the third user input. For example, as shown in FIG. 6, the circuitry 202 may present the first UI element 702 (such as, a dropdown menu list) though the display device 208A to the user 112. The first UI element 702 may include a plurality of items, each of which may indicate a certain time interval after which the HVAC system 318 is to be started. For example, the first UI element 702 may include time interval options, such as, "5 minutes", "10 minutes", "20 minutes", and "40 minutes". The circuitry 202 may receive the third user input as a selection of one of the items of the first UI element 702. For example, the circuitry 202 may receive a selection of the second UI element 704 (e.g., an item that may correspond to a time interval of "10 minutes") from the user 112 as the third user input. In such case, the time interval of "10 minutes" may be selected as a time interval after which the stopped HVAC system 318 of the selected vehicle 104A is to be started. In another example, the circuitry 202 may receive the third user input as a tactile gesture from the user 112 through at least one of the haptic device 106 and/or the display device 208A. The third user input may provide the time duration after which the stopped HVAC system 318 of the selected first vehicle 104A may be started. For example, in the winter or in certain areas where temperature is low (e.g., less than 0 degrees Celsius), the HVAC system 318 of the selected first vehicle 104A may be required to be started to warm the cabin of the selected first vehicle 104A, for comfort of the user 112 and other occupants of the first vehicle 104A, before the ride of the selected first vehicle 104A starts. Similarly, during summers or in certain areas where the temperature is high (e.g., more than 35 degrees Celsius), the HVAC system of the selected first vehicle 104A may be required to be started to cool the cabin of the selected first vehicle 104A, for the comfort of the user 112 and other occupants of the first vehicle 104A, before the ride of the selected first vehicle 104A starts.

As described in FIGS. 5-6, once the third user input is received, the circuitry 202 may be configured to start a countdown timer based on the time interval indicated in the third user input. For example, in case the time interval of "10 minutes" is selected through the second UI element 704, the countdown timer may start from "10 minutes". As shown in FIG. 7, there is shown an exemplary user interface element, such as, the third UI element 706 that may present the current time left (e.g., "55 seconds") for expiration of the started countdown timer. In an embodiment, the circuitry 202 may receive, through the third UI element 706, a user input to reset the time interval of the countdown timer to the initially set value (e.g., "10 minutes"). Once the countdown timer expires (i.e., reaches zero value), the circuitry 202 may be configured to remotely control the selected first vehicle 104A to start the stopped HVAC system 318 of the selected first vehicle 104A. For example, once the HVAC system 318 is started on the selected first vehicle 104A, the circuitry 202 may present the fourth UI element 708 indicative of a status of the HVAC system 318 (i.e., "HVAC Started"). It should be noted that the UI 700 of FIG. 7 is for exemplary purposes and should not be construed to limit the scope of the disclosure.

Figure 8:
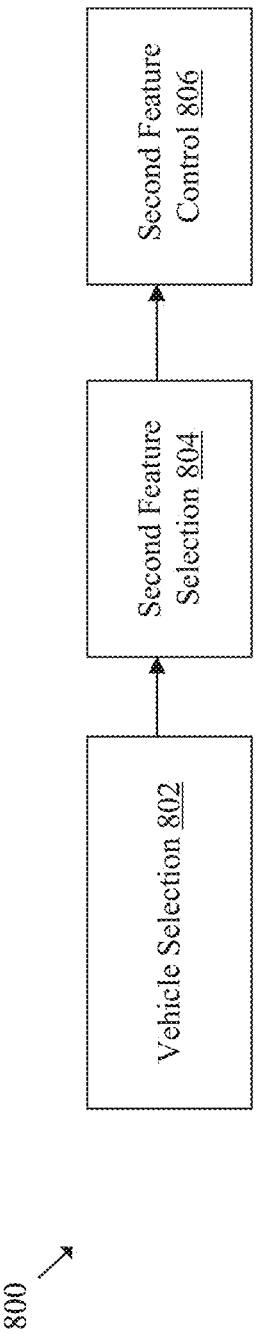
FIG. 8 is a diagram that illustrates an execution scenario to remotely control a second set of features on a first vehicle, in accordance with an embodiment of the disclosure.

FIG. 8 is a diagram that illustrates an execution scenario to remotely control a second set of features on a first vehicle, in accordance with an embodiment of the disclosure. FIG. 8 is explained in conjunction with elements from FIGS. 1, 2, 3, 4A, 4B, 5, 6, and 7. With reference to FIG. 8, there is shown an execution scenario 800 of exemplary operations from 802 to 806 performed by the electronic device 102 or by the circuitry 202.

At 802, a vehicle selection operation may be executed. In the vehicle selection operation, the circuitry 202 may be configured to receive the first user input indicative of the selection of the first vehicle (e.g., the first vehicle 104A) from the set of vehicles 104 associated with the user 112. For example, the first vehicle 104A may be selected for remote control of a second set of features on the selected first vehicle 104A. Details related to the vehicle selection operation are described further, for example, in FIG. 4, at operation 402.

At 804, a second feature selection operation may be executed. In the second feature selection operation, the circuitry 202 may be configured to receive a fourth user input indicative of an instruction to remotely control a second set of features on the selected first vehicle 104A. For example, the second set of features correspond to at least one of, but is not limited to, a head light control feature, a wiper control feature, a sunroof control feature, a seat temperature control feature, or a horn control feature associated with the selected first vehicle 104A. The circuitry 202 may be further configured remotely control the second set of features on the selected first vehicle based on the received fourth user input. For example, the second set of features of the selected first vehicle 104A may be features that may not be critical features. The second set of features have been separated to distinguish from the first set of features that are critical and may need to be activated and deactivated with care.

The electronic device 102 may remotely control the second set of features based on the fourth user input. The head light control feature may be used to activate or deactivate a headlight of the selected first vehicle 104A remotely. The wiper control feature may be used to activate or deactivate a wiper of the selected first vehicle 104A remotely. For example, the wiper control feature may be employed to activate the wiper of the selected first vehicle 104A to remotely clean a windshield of the selected first vehicle 104A before the user 112 rides the selected first vehicle 104A. The sunroof control feature may be used to open or close a sunroof of the selected first vehicle 104A remotely. For example, the sunroof control feature may be used to open the sunroof of the selected first vehicle 104A remotely for ventilation and sunlight. The seat temperature control feature may be used to activate or deactivate heating or cooling of one or more seats of the selected first vehicle 104A remotely. For example, the seat temperature control feature may be used to activate a seat heater of the selected first vehicle 104A to remotely warm the seat before the user 112 rides the selected first vehicle 104A. The horn control feature may be used to activate or deactivate a horn of the selected first vehicle 104A remotely. For example, when the first vehicle 104A is positioned in a parking and the user 112 wishes to clear the traffic near the selected first vehicle 104A, the horn control feature may be activated (for example for 30 seconds). The fourth user input may be received in a manner similar to the reception of the second user input, as described, for example, at 404 of FIG. 4. The fourth user input may be received via one of, but is not limited to, an auto-populate user interface element, a drop-down menu, a tap-based user input, a swipe-based user input, or a tactile gesture user input through the I/O device 208. Based on the received fourth user input, the circuitry 202 of the electronic device 102 may control the second set of features of the selected first vehicle 104A.

At 806, a second feature control operation of the vehicle may be executed. In the second feature control operation of the vehicle, the circuitry 202 may remotely control the second set of features on the selected first vehicle 104A based on the received fourth user input. For example, the fourth user input may correspond to an instruction to blow a horn of the first vehicle 104A for certain time period (say for 10 seconds). Based on the vehicle identification information of the first vehicle 104A and the received fourth user input, the circuitry 202 may query the server 108 (or the database 110) for information related to the instructions to blow the horn of the first vehicle 104A for a certain time (e.g., 10 seconds). Based on the query, the circuitry 202 may receive the information (such as one or more wireless commands), related to the instructions to start the horn of the first vehicle 104A, from the server 108 (or the database 110). The circuitry 202 may further transmit the instructions to blow the horn of the first vehicle 104A to the first vehicle 104A, based on the information received from the server 108 (or the database 110). In some embodiments, the electronic device 102 may store different instructions related to the second of features (i.e., related to the first vehicle 104A) in the memory 204 and may not query the server 108 (or the database 110). In such case, the circuitry 202 may retrieve the corresponding instructions to control one of the second set of features from the memory 204, based on the received fourth user input. The first vehicle 104A may further blow the horn of the first vehicle 104A on receipt of the instructions from the circuitry 202, and thereby the circuitry 202 may remotely control the first vehicle 104A. Post the control of the second set of features, the circuitry 202 may receive a confirmation indicative of the activation or deactivation of a feature (of the second set of features) on the first vehicle 104A, as described, for example, at 408 in FIG. 4. Further, the circuitry 202 may control the haptic device 106 to output a haptic feedback, based on the reception of the confirmation, as described, for example, at 410 in FIG. 4. The haptic feedback may indicate that the second set of features have been controlled on the selected first vehicle 104A.

Figure 9:
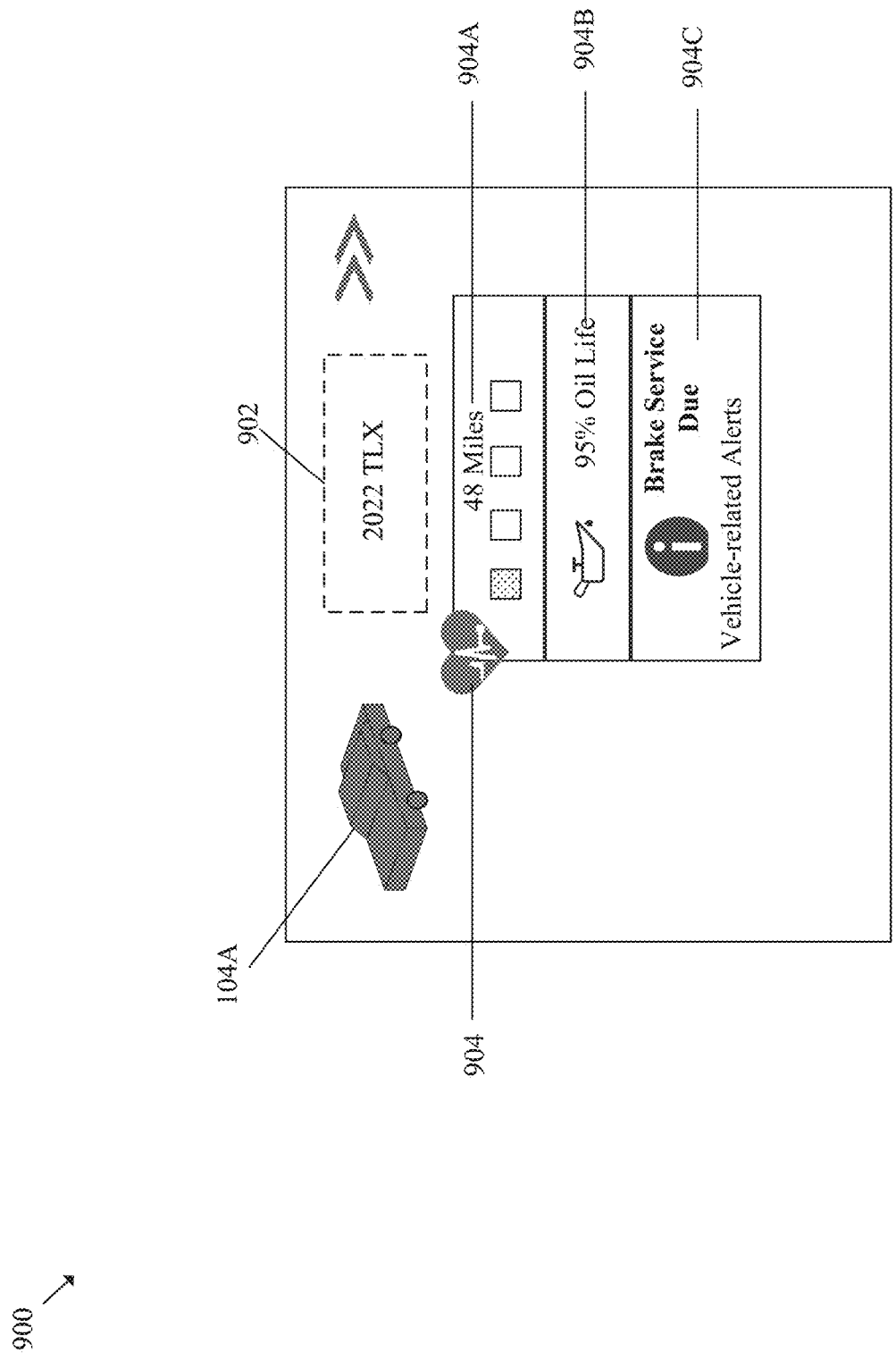
FIG. 9 is a diagram that illustrates an exemplary scenario of a user interface of the electronic device of FIG. 1 to provide health status information and vehicle identification information, in accordance with an embodiment of the disclosure.

FIG. 9 is a diagram that illustrates an exemplary scenario of a user interface of the electronic device of FIG. 1 to display health status information and vehicle identification information, in accordance with an embodiment of the disclosure. FIG. 9 is explained in conjunction with elements from FIGS. 1, 2, 3, 4A, 4B, 5, 6, 7, and 8. With reference to FIG. 9 there is shown an exemplary scenario of a user interface (UI) 900. The UI 900 may include a set of UI elements including a first UI element 902 and a second UI element 904. The circuitry 202 may be configured to control the display device 208A of the electronic device 102 to display the UI 900 including the set of UI elements. A set of operations associated with the exemplary scenario is described herein.

In an embodiment, the circuitry 202 may be configured to receive the vehicle identification information associated with each of the set of vehicles 104 associated with (such as owned or used by) the user 112. The circuitry 202 may be further configured to control a display screen (e.g., the display device 208A) of the electronic device 102 to display the received vehicle identification information associated with each of the set of vehicles 104 or associated with the selected first vehicle 104A. For example, the received vehicle identification information may include at least one of, but is not limited to, a vehicle name, a vehicle manufacturer, a vehicle model, a vehicle color, a year of manufacture, a vehicle chassis number, a vehicle engine number, or a vehicle registration number, associated with each of the set of vehicles 104. The vehicle name may be a name given to the vehicle at the time of registration. The vehicle name of the vehicle may be a user-defined name of the vehicle that may be defined or changed from a settings menu (not shown) of the UI 900. The vehicle manufacturer of the vehicle may be a name of the manufacturer of the vehicle. The vehicle model of the vehicle may be a model number associated with the vehicle. The vehicle color of the vehicle may be a body color of the vehicle such as, black, white, coral, and the like. The year of manufacture of the vehicle may a year in which the vehicle is manufactured by the manufacturer. The vehicle registration number of the vehicle may be a unique number that may be associated with a license plate number of the vehicle. The vehicle chassis number and the vehicle engine number may be a unique number that may be associated with a chassis and an engine of the vehicle, respectively. The vehicle identification information associated with each of the set of vehicles 104 may be received as a user input from the user 112 at the time of registration of the vehicle and may be stored in the memory 204 of the electronic device 102. The vehicle identification information of each vehicle may be also stored in the memory 306 of the respective vehicle.

The circuitry 202 may retrieve the vehicle identification information of the first vehicle 104A from the memory 204 or receive the vehicle identification information from the first vehicle 104A, which may store the vehicle identification information in the memory 306. The first UI element 902 on the UI 900 may display the vehicle identification information. For example, as shown in FIG. 9, the vehicle identification information of the selected first vehicle 104A may be "2022 TLX". For example, the year of manufacture may be "2022" and the vehicle model may be "TLX". In an embodiment, the circuitry 202 may be further configured to receive from the selected first vehicle 104A, health status information associated with the selected first vehicle 104A based on the received first user input. The circuitry 202 may transmit one or more requests to the electronic control device 304 of the first vehicle 104A to provide the health status information. In some embodiments, the electronic control device 304 may capture the health status information of the first vehicle 104A from the plurality of sensors associated with the first vehicle 104A. In an embodiment, the health status information may include time-stamp information that may indicate real-time date and time of the capture of vehicle-related data from the plurality of sensors. The circuitry 202 may be further configured to control a display screen (e.g., the display device 208A) of the electronic device 102 to display the received health status information (i.e., associated with the selected first vehicle 104A) and the time-stamp information related to the last update of the health status information of the first vehicle 104A. For example, the received health status information may include at least one of, but is not limited to, an engine parameter status, a vehicle-related alert, a tire pressure status, a vehicle range, odometer reading information, a fuel status, or an oil life, associated with the selected first vehicle 104A. The health status information may provide information related to an operational condition of the selected first vehicle 104A so that the user 112 may take proper actions according to the requirements of the selected first vehicle 104A. The displayed time-stamp information (not shown) may provide the last update of the operational/health conditions of the first vehicle 104A (for example health/condition status updated 1 hour ago or on a particular date/time). The engine parameter status may provide information related to, but is not limited to, power, torque, fuel consumption and the like of the engine. The vehicle-related alert may indicate different conditions related to the selected first vehicle 104A that may be needed to be taken care for the selected first vehicle 104A to function properly. The tire pressure status may provide information related to a pressure of the tires of the selected first vehicle 104A. For example, a message 'ok' may be provided under tire pressure status on the display device 208A to denote that the tire pressure of all the tires of the selected first vehicle 104A is within recommended pressure values. In another example, a value of the tire pressure may be provided to indicate the tire pressure status. The odometer reading information may provide a total already distance covered by the selected first vehicle 104A. For example, 5000 Kilometers may be displayed under the odometer reading information in case the first vehicle 104A has covered a total of 5000 Km distance since purchase. The fuel status may indicate information related to the fuel left in a fuel tank of the selected first vehicle 104A. The oil life may denote a quality/quantity of the oil present in the engine and may be provided in a percentage.

In an embodiment, the fuel status may indicate at least one of, but is not limited to, an amount of fuel left in the selected first vehicle 104A, a time duration for which an engine (e.g., the engine 308) of the selected first vehicle 104A is on, or a distance that can be covered by the selected first vehicle 104A based on the amount of fuel left in the selected first vehicle 104A. The amount of fuel left in the fuel tank of the selected first vehicle 104A may be indicated in liters that may be depicted on the UI 900. In some cases, instead of displaying a value of the exact amount of fuel left, a graphical representation of the amount of fuel left (for e.g., in the form of bars, pie charts, and the like) may be displayed. The time duration for which the engine 308 of the selected first vehicle 104A may be on (with the amount of fuel left in the selected first vehicle 104A) may be also displayed in the UI 900. Further, the distance that may be covered by the selected first vehicle 104A based on the amount of fuel left may be also displayed in the UI 900.

In an embodiment, the vehicle-related alert may include one or more recommendations for the selected first vehicle 104A. For example, the one or more recommendations may be associated with an operation and maintenance of the selected first vehicle 104A. The vehicle-related alerts may indicate different conditions related to the selected first vehicle 104A that may need to be taken care for the selected first vehicle 104A to function smoothly. The one or more recommendations associated with the operation and maintenance of the selected first vehicle may be corrective recommendations, preventive recommendations, risk-based or condition-based recommendations.

For example, as shown in the UI 900, the health status information associated with the selected first vehicle 104A may be displayed in the second UI element 904. The second UI element 904 may include a UI element 904A to display the fuel status. For example, the fuel status may be indicative of the amount of fuel left in the selected first vehicle 104A. The UI element 904A may also provide a distance (e.g., 48 miles) that may be traversed by the selected first vehicle 104A with the amount of the fuel left in the selected first vehicle 104A. The second UI element 904 may further include a UI element 904B to display information related to the oil life of the selected first vehicle 104A. For example, the information related to the oil life may indicate a 95 percent oil life of the first vehicle 104A. The information related to the oil life may be also provided graphically as bar charts, pie charts, and the like. The second UI element 904 may further include a UI element 904C to display information related to the vehicle-related alerts of the selected first vehicle 104A. For example, the information related to the vehicle-related alerts may indicate a message such as, "Brake Service Due" for selected first vehicle 104A. Based on such vehicle-related alert, the user 112 may book for servicing or repair of the brakes of the first vehicle 104A.

In an embodiment, the circuitry 202 may be further configured to control the display device 208A to render information about a walk back and time alert feature to the user 112. Such feature may determine current location of the electronic device 102 (or the user 112) and provide a path to the selected first vehicle 104A (for example when the user 112 wants to reach to the vehicle parked at a parking location). The walk back and time alert feature may be also provided for electric vehicles. For example, when an electric vehicle of the user 112 is being charged, the circuitry 202 may control the display device 208A to display a notification to the user 112, that may indicate that the user 112 should walk back to the electric vehicle in case the vehicle is about to be fully charged. Such notification may prevent the user 112 from overpaying for charging of the electric vehicle. For example, charging of electric vehicles for certain time duration may be free, for example, for 6 minutes. However, if the electric vehicle is still plugged beyond the particular time duration (e.g., 6 minutes), the user 112 may have to pay for the additional charging time. An example of such notification may include a message, such as, 'you are 8 minutes away and your vehicle will be charged in 8 minutes, so please start walking back towards your vehicle'. The electronic device 102 may also guide the user 112 back to the selected first vehicle 104A, based on a display of a path from the current location of the user 112 to the first vehicle 104A.

Figure 10A:
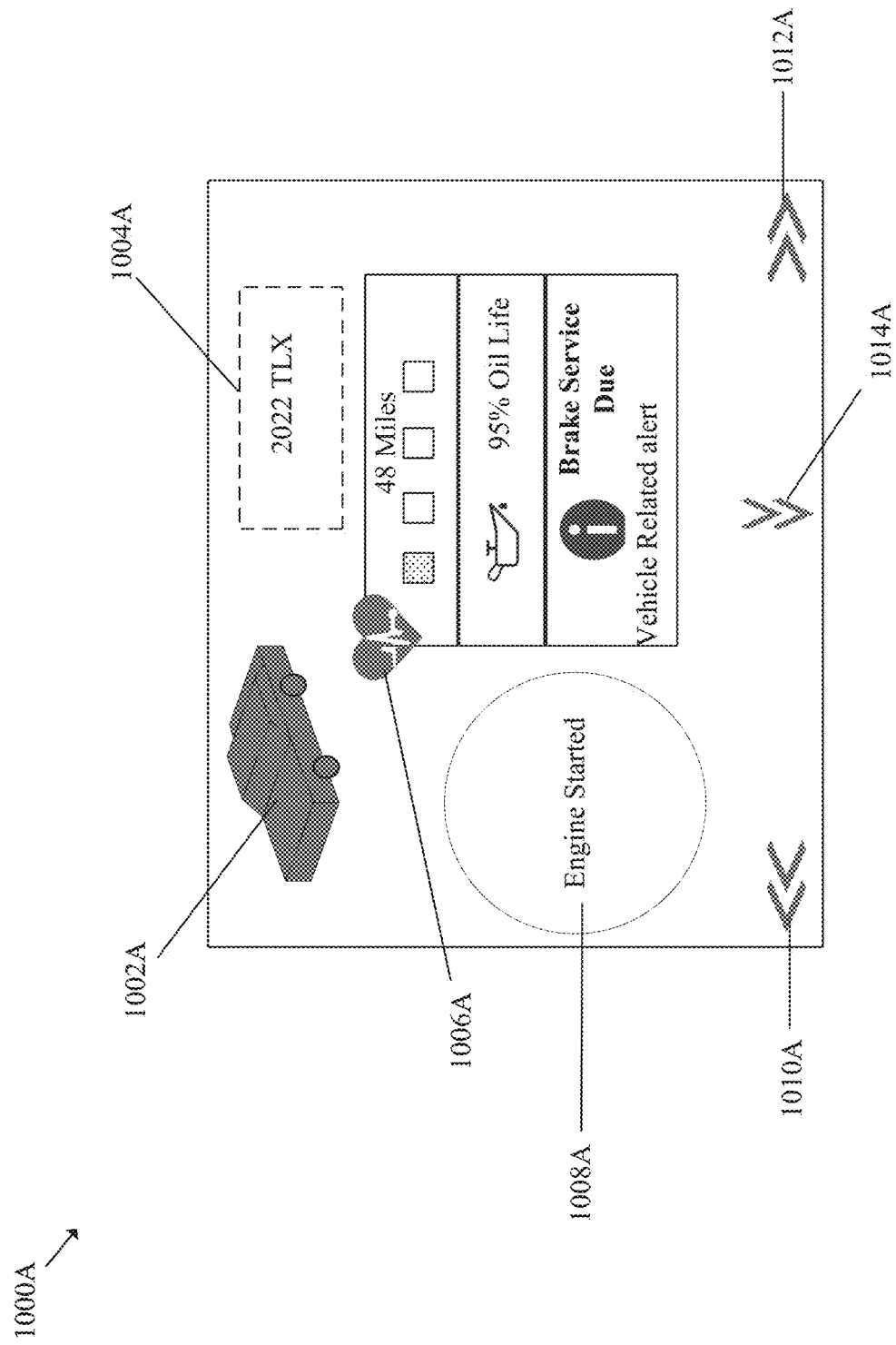
FIG. 10A is a diagram that illustrates an exemplary scenario of a first user interface of the electronic device of FIG. 1 to control features of a selected first vehicle, in accordance with an embodiment of the disclosure.

FIG. 10A is a diagram that illustrates an exemplary scenario of a first user interface of the electronic device of FIG. 1 to control features of the selected first vehicle, in accordance with an embodiment of the disclosure. FIG. 10A is explained in conjunction with elements from FIGS. 1, 2, 3, 4A, 4B, 5, 6, 7, 8, and 9. With reference to FIG. 10A there is shown an exemplary scenario of a first user interface (UI) 1000A. The first UI 1000A may include a set of UI elements including a first UI element 1002A, a second UI element 1004A, a third UI element 1006A, a fourth UI element 1008A, a fifth UI element 1010A, a sixth UI element 1012A, and a seventh UI element 1014A. The circuitry 202 may be configured to control the display device 208A of the electronic device 102 to display the first UI 1000A including the set of UI elements. A set of operations associated with the exemplary scenario is described herein.

In an embodiment, the circuitry 202 may be configured to control a display screen (e.g., the display device 208A) associated with the electronic device 102 to display a first user interface (e.g., the first UI 1000A) indicating first information about the first set of features and/or the health status information of the selected first vehicle 104A. For example, the first UI 1000A may include the first UI element 1002A that may display an image or icon of the selected first vehicle 104A. The first UI 1000A may further include the second UI element 1004A that may display the vehicle identification information associated with the first vehicle 104A. For example, as shown in FIG. 10A, the second UI element 1004A may display a vehicle model (e.g., "TLX") and a year of manufacture (e.g., "2022") of the first vehicle 104A. In some embodiments, the vehicle identification information may be displayed on the first UI 1000A in a particular color corresponding to the vehicle color of the first vehicle 104A. The first UI 1000A may further include the third UI element 1006A that may display the health status information associated with the first vehicle 104A. For example, the health status information may include a fuel status (e.g., a range of "48 miles"), an oil life (e.g., "95% oil life"), and a vehicle-related alert (e.g., a message such as, "Brake Service Due") associated with the first vehicle 104A as described, for example, in FIG. 9. The first UI 1000A may further include the fourth UI element 1008A that may display information related to the first set of features controlled for the first vehicle 104A. Such information may correspond to the first information about the first set of features controlled on the first vehicle 104A. For example, the fourth UI element 1008A may display an operation status of the engine 308 of the first vehicle 104A (i.e., controlled by the electronic device 102), such as, a message indicating "Engine Started' to denote that the engine 308 of the first vehicle 104A is on. The first UI 1000A may further include the fifth UI element 1010A and the sixth UI element 1012A that, once selected by the user 112, may be used to navigate to other user interfaces (of the display device 208A) related to other vehicles in the set of vehicles 104. The first UI 1000A may further include the seventh UI element 1014A that, once selected by the user 112, may be used to view secondary or additional data related to the first information. The secondary data may be the data included in the first information that may not be displayed on the display device 208A due to size constraint of the display device 208A. It may be noted that instead of the fifth UI element 1010A, the sixth UI element 1012A, and the seventh UI element 1014A, user input modes such as, a swipe user input mode, a tactile gesture user input mode, or a tap user input mode may be also provided for the same purpose of switching the user interfaces (related to different vehicles) on the display device 208A. It should be noted that the first UI 1000A of FIG. 10A is for exemplary purpose and should not be construed to limit the scope of the disclosure.

In the exemplary scenario, the first set of features of the selected first vehicle 104A may be controlled based on a receipt of the second user input via the first UI 1000A. The control of the first set of features of the selected first vehicle 104A is described further, for example, in FIGS. 4A and 4B. In certain cases, more than one vehicle may be associated with user 112 (such as the user 112 owns and controls multiple vehicles). In some cases, the electronic device 102 may be used to remotely control more than one vehicle at a time based on a set of user inputs received from the user 112. For example, the user 112 may wish to control the first vehicle 104A and a second vehicle 104B, which is different from the first vehicle 104A. In such cases, the circuitry 202 may receive the second user input through the first UI 1000A to control the first set of features on the first vehicle 104A, as described in the aforementioned (for example in FIGS. 4A and 4B). The circuitry 202 may be further configured to receive a third user input to display second information about a first set of features controlled on a second vehicle (e.g., the second vehicle 104B) of the set of vehicles 104. Based on the received third user input, the circuitry 202 may be further configured to control the display screen (e.g., the display device 208A) to display, via a second user interface (e.g., a second UI 1000B of FIG. 10B), the second information of the second vehicle 104B and at least one of an icon or a highlighted portion, which notifies the user 112 about the first information indicated on the first UI 1000A or about the controlled first set of features of the first vehicle 104A. The first information may provide data related to the first set of features which may be controlled for the first vehicle 104A. The second information may provide data related to the first set of features which may be controlled for the second vehicle 104B.

Figure 10B:
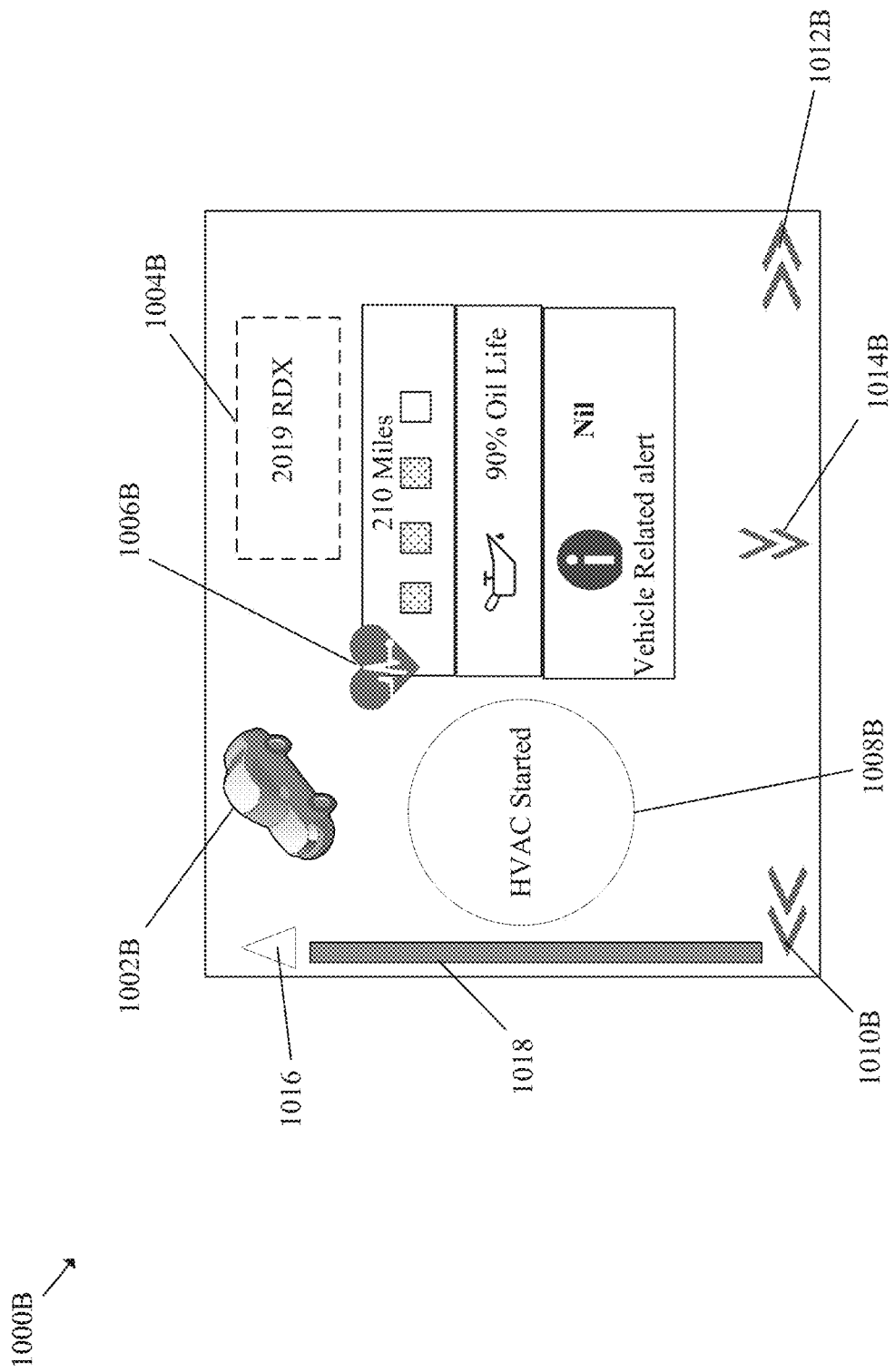
FIG. 10B is a diagram that illustrates an exemplary scenario of a second user interface of the electronic device of FIG. 1 to control features of a second vehicle, in accordance with an embodiment of the disclosure.

FIG. 10B is a diagram that illustrates an exemplary scenario of a second user interface of the electronic device of FIG. 1 to control features of a second vehicle, in accordance with an embodiment of the disclosure. FIG. 10B is explained in conjunction with elements from FIGS. 1, 2, 3, 4A, 4B, 5, 6, 7, 8, 9, and 10A. With reference to FIG. 10B, there is shown an exemplary scenario of a second user interface (UI) 1000B. The second UI 1000B may include a set of UI elements including a first UI element 1002B, a second UI element 1004B, a third UI element 1006B, a fourth UI element 1008B, a fifth UI element 1010B, a sixth UI element 1012B, a seventh UI element 1014B, an eight UI element 1016, and a ninth UI element 1018. The circuitry 202 may be configured to control the display device 208A of the electronic device 102 to display the second UI 1000B including the set of UI elements. A set of operations associated with the exemplary scenario is described herein.

It may be noted that the second UI 1000B may be displayed on the display device 208A when the sixth UI element 1012A is selected on the first UI 1000A. The second UI 1000B may display the second information related to the second vehicle 104B. For example, the second UI 1000B may include the first UI element 1002B that may display an image or icon of the second vehicle 104B. The second UI 1000B may further include the second UI element 1004B that may display the vehicle identification information of the second vehicle 104B. For example, as shown in FIG. 10B, the second UI element 1004B may display a vehicle model (e.g., "RDX") and a year of manufacture (e.g., "2019") of the second vehicle 104B. In some embodiments, the vehicle identification information may be displayed on the second UI 1000B in a particular color corresponding to the vehicle color of the second vehicle 104B. The second UI 1000B may further include the third UI element 1006B that may display the health status information associated with the second vehicle 104B. For example, the health status information may include a fuel status (e.g., a range of "210 miles"), an oil life (e.g., "90% oil life"), and a vehicle-related alert (e.g., NIL in case of no vehicle-related alerts) associated with the second vehicle 104B. The second UI 1000B may further include the fourth UI element 1008A that may display information related to the first set of features controlled for the second vehicle 104B. Such information may correspond to the second information about the first set of features controlled on the second vehicle 104B. For example, the fourth UI element 1008B may display an operation status of an HVAC system that may be remotely controlled for the second vehicle 104B, such as, a message indicating 'HVAC Started' to denote that the HVAC of the second vehicle 104B is on. The second UI 1000B may further include the fifth UI element 1010B and the sixth UI element 1012B that may have functionalities (i.e., to navigate between user interfaces (UIs) related to different vehicles) that may be similar to functionalities of the fifth UI element 1010A and the sixth UI element 1012A, described in FIG. 10A. The second UI 1000B may further include the seventh UI element 1014B that may be similar to the seventh UI element 1014A in FIG. 10A and may be used to view secondary/additional data related to the second information for the second vehicle 104B. It may be noted that instead of the fifth UI element 1010B, the sixth UI element 1012B, and the seventh UI element 1014B, user input modes such as, a swipe user input mode, a tactile gesture user input mode, or a tap user input mode may be also provided for the same purpose of switching the user interfaces (related to different vehicles) on the display device 208A.

The second UI 1000B may further include the eighth UI element 1016 that may indicate the icon to notify the user 112 about the first information indicated on the first UI 1000A or about the first set of features currently controlled for the first vehicle 104A. For example, the eighth UI element 1016 may notify to the user 112 that a vehicle-related alert (or health status information) is present for the first vehicle 104A on the first UI 1000A and/or notify the user 112 about the 'Engine Started' operation controlled for the first vehicle 104A at the same time. In an embodiment, the display device 208A may include the ninth UI element 1018 that may be the highlighted portion that may indicate the first information related to the controlled first set of features of the first vehicle 104A. For example, the ninth UI element 1018 may notify to the user 112 about the vehicle-related alert (i.e., "Break Service Due") and/or that the engine 308 of the first vehicle 104A is on. In an embodiment, the highlighted portion may be of a color similar to the vehicle color of the first vehicle 104A to indicate about the first vehicle 104A. Similarly, if the user 112 has three vehicles and the first set of features on the first vehicle 104A and a third vehicle are being controlled remotely at same time, then the second UI 1000B may further include a tenth UI element (such as another icon, not shown) and/or an eleventh UI element (such as another highlighted portion, not shown) to provide notification to the user 112 about the third controlled vehicle, similar to the eighth UI element 1016 and the ninth UI element 1018, respectively used to provide notification about the first vehicle 104A. For example, the tenth UI element may indicate information about the vehicle-related alerts or health status information present for the third vehicle in a third UI associated with the third vehicle. The eleventh UI element may further indicate information related to the controlled first set of features of the third vehicle and may be of a color similar to the vehicle color of the third vehicle.

Based on such real-time notifications provided to the user 112 about the first set of features being controlled for another vehicle (e.g., the first vehicle 104A) and/or about the vehicle-alerts (or health status information) related to the other vehicle (e.g., the first vehicle 104A) shown on another user interface (such as the first UI 1000A), while a different UI (i.e., second UI 1000B) related to different vehicle (i.e. second vehicle 104B) is rendered, the user 112 may be made aware that the other vehicle (e.g., the first vehicle 104A) needs appropriate attention of the user 112 as well at the same time. This may enhance the user experience of the user 112 and also provide timely notifications to the user 112, which may result in cost savings for the user 112 and effective handling and maintenance in the long run for different remotely controlled vehicles by the disclosed electronic device 102. In an embodiment, the circuitry 202 may control the display device 208A to render at least one of the eighth and tenth UI elements or the ninth and eleventh UI elements, to provide the notification to the user 112 about the information currently rendered on different user interfaces (UI) related to different vehicles.

In an embodiment, the circuitry 202 may be further configured to receive a fourth user input, via the second UI 1000B, to select one feature of the first set of features for the second vehicle 104B. The circuitry 202 may be further configured to control the selected one feature of the first set of features on the second vehicle 104B based on the fourth user input, received via the second UI. The fourth user input may be received in a way similar to the second user input, as described, for example, at 404 in FIG. 4A. The circuitry 202 may further select the feature to be remotely controlled from the first set of features of the second vehicle 104B, based on the fourth user input of the user 112, received through the second UI 1000B. In an embodiment, the fourth user input may include a tactile gesture similar to the tactile gesture described, for example, at 404 in FIG. 4A. Based on the received fourth input including the tactile gesture, the circuitry 202 may control the selected feature of the second vehicle 104B. For example, through the second UI 1000B, the user 112 may select the air-conditioning (i.e., the HVAC) system control feature and may provide a tactile gesture including a first swipe input in the first direction 116A and a second swipe input in the second direction 116B that may be, for example, perpendicular to the first direction 116A on the second UI 1000B described, for example, at 404 in FIG. 4A. Based on the fourth user input including the tactile gesture, the circuitry 202 may switch on the HVAC (or any device such as engine, door, window, luggage compartment, or infotainment device) of the second vehicle 104B.

Figure 11:
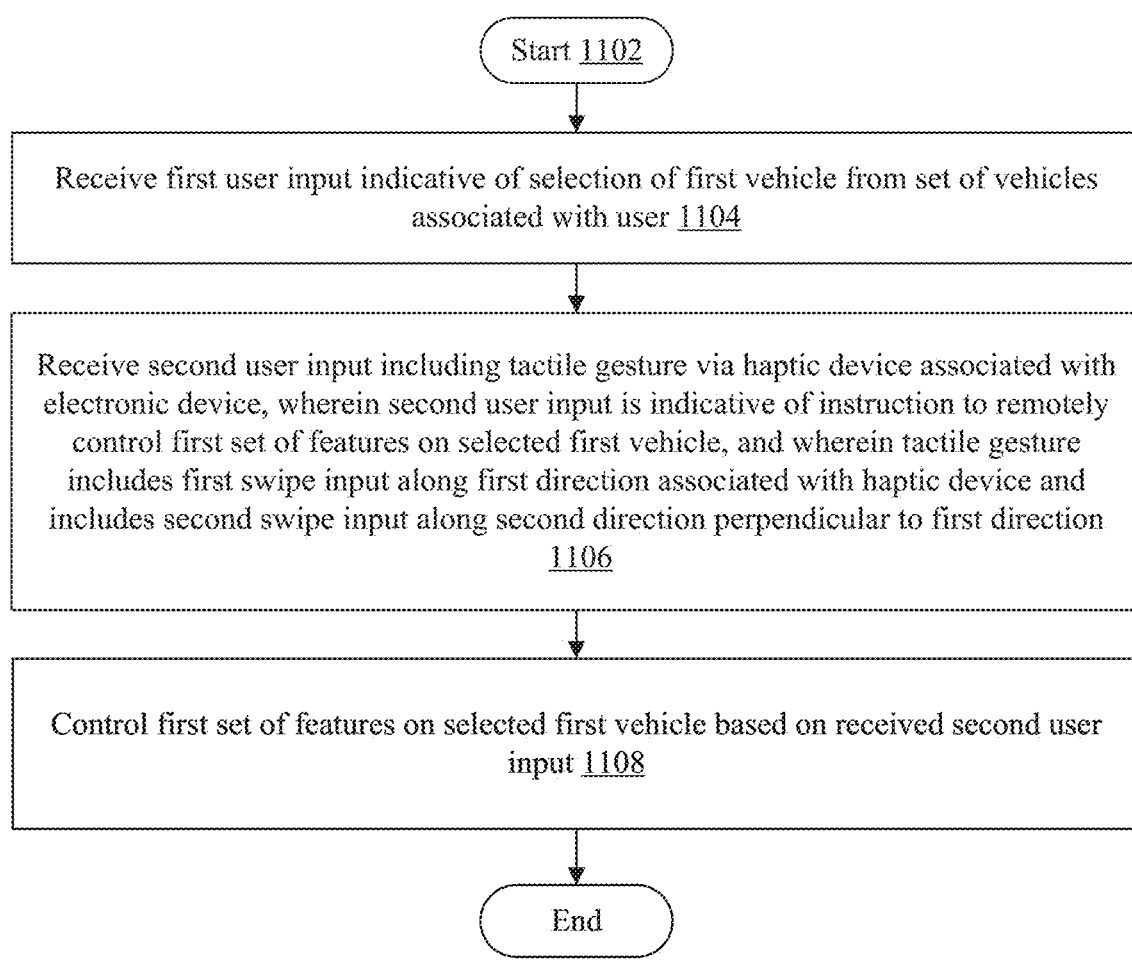
FIG. 11 is a flowchart that illustrates exemplary operations to control features of a vehicle, in accordance with an embodiment of the disclosure.

FIG. 11 is a flowchart that illustrates exemplary operations to control features of a vehicle, in accordance with an embodiment of the disclosure. With reference to FIG. 11, there is shown a flowchart 1100. The flowchart 1100 is described in conjunction with FIGS. 1, 2, 3, 4A, 4B, 5, 6, 7, 8, 9, 10A, and 10B. The operations from 1102 to 1108 may be implemented, for example, by the circuitry 202 of the electronic device 102 of FIG. 2. The operations of the flowchart 1100 may start at 1102 and proceed to 1104.

At 1104, the first user input indicative of the selection of the first vehicle 104A from the set of vehicles 104 associated with the user 112, may be received. For example, the set of vehicles 104 may be vehicles owned and/or operated by the user 112. In an embodiment, the circuitry 202 may be configured to receive the first user input indicative of the selection of the first vehicle 104A from the set of vehicles 104. Details related to the reception of the first user input are provided, for example, in FIG. 4A (at 402).

At 1106, the second user input including the tactile gesture may be received via the haptic device 106 associated with the electronic device 102. For example, the second user input may be indicative of the instruction to remotely control the first set of features on the selected first vehicle 104A. The tactile gesture may include the first swipe input along the first direction 116A associated with the haptic device 106 and may include the second swipe input along the second direction 116B, for example, perpendicular to the first direction 116A. In an embodiment, the circuitry 202 may be configured to receive the second user input including the tactile gesture, via the haptic device 106 associated with the electronic device 102. The second user input may be provided once a feature, which is to be controlled is selected from the first set of features. For example, the tactile gesture may be in swipe-input shape configurations such as, an L-shaped swipe configuration, a vertically inverted L-shaped swipe configuration, a horizontally inverted L-shaped swipe configuration, a T-shaped swipe configuration, or an inverted T-shaped swipe configuration. Details related to the reception of the second user input are provided, for example, in FIG. 4A (at 404).

At 1108, the first set of features may be controlled on the selected first vehicle 104A based on the received second user input. In an embodiment, the circuitry 202 may be configured to control the first set of features on the selected first vehicle 104A based on the second user input including the tactile gesture. For example, the circuitry 202 may transmit the instructions (i.e., associated with the control of the first set of features) to the electronic control device 304 of the selected first vehicle 104A. The instructions may be transmitted, so that the selected first vehicle 104A may perform one or more operations needed to control the selected feature on the selected first vehicle 104A. For example, the engine 308 of the selected first vehicle 104A may be turned on based on the second user input. Details related to the control of the first set of features on the selected first vehicle 104A are provided, for example, in FIG. 4A (at 406). Control may pass to end.

Although the flowchart 1100 is illustrated as discrete operations, such as 1104, 1106, and 1108 the disclosure is not so limited. Accordingly, in certain embodiments, such discrete operations may be further divided into additional operations, combined into fewer operations, or eliminated, depending on the particular implementation without detracting from the essence of the disclosed embodiments.

Various embodiments of the disclosure may provide a non-transitory, computer-readable medium and/or storage medium, and/or a non-transitory machine readable medium and/or storage medium stored thereon, a set of instructions executable by a machine and/or a computer (such as, the electronic device 102) to control a first set of features on a selected first vehicle remotely. The instructions may cause the machine and/or computer (for example, the electronic device 102) to perform operations that include reception of the first user input indicative of the selection of the first vehicle 104A from the set of vehicles 104 associated with the user 112. The operations may further include reception of the second user input including the tactile gesture via the haptic device 106 associated with the electronic device 102. For example, second user input may be indicative of the instruction to remotely control the first set of features on the selected first vehicle 104A. The tactile gesture may include the first swipe input along the first direction 116A associated with the haptic device 106 and may include the second swipe input along the second direction 116B that may be perpendicular to the first direction 116A. The operations may further include control of the first set of features on the selected first vehicle 104A based on the received second user input.

The present disclosure may be realized in hardware, or a combination of hardware and software. The present disclosure may be realized in a centralized fashion, in at least one computer system, or in a distributed fashion, where different elements may be spread across several interconnected computer systems. A computer system or other apparatus adapted for carrying out the methods described herein may be suited. A combination of hardware and software may be a general-purpose computer system with a computer program that, when loaded and executed, may control the computer system such that it carries out the methods described herein. The present disclosure may be realized in hardware that includes a portion of an integrated circuit that also performs other functions. It may be understood that, depending on the embodiment, some of the steps described above may be eliminated, while other additional steps may be added, and the sequence of steps may be changed.

The present disclosure may also be embedded in a computer program product, which includes all the features that enable the implementation of the methods described herein, and which when loaded in a computer system is able to carry out these methods. Computer program, in the present context, means any expression, in any language, code or notation, of a set of instructions intended to cause a system with an information processing capability to perform a particular function either directly, or after either or both of the following: a) conversion to another language, code or notation; b) reproduction in a different material form. While the present disclosure has been described with reference to certain embodiments, it will be understood by those skilled in the art that various changes may be made, and equivalents may be substituted without departing from the scope of the present disclosure. In addition, many modifications may be made to adapt a particular situation or material to the teachings of the present disclosure without departing from its scope. Therefore, it is intended that the present disclosure not be limited to the particular embodiment disclosed, but that the present disclosure will include all embodiments that fall within the scope of the appended claims.

What is claimed is:

1. An electronic device, comprising:
   circuitry configured to:
   receive a first user input indicative of a selection of a first vehicle from a set of vehicles associated with a user;
   receive, via a haptic device associated with the electronic device, a second user input including a tactile gesture, wherein the second user input is indicative of an instruction to remotely control a first set of features on the selected first vehicle, and the tactile gesture includes a first swipe input along a first direction associated with the haptic device and includes a second swipe input along a second direction perpendicular to the first direction;
   control the first set of features on the selected first vehicle based on the received second user input;
   control a display screen associated with the electronic device to display a first user interface (UI) indicating first information about the first set of features of the selected first vehicle, wherein the first set of features of the first vehicle are controlled based on a receipt of the second user input via the first UI;
   receive a third user input to display second information about a first set of features controlled on a second vehicle of the set of vehicles, wherein the second vehicle is different from the first vehicle; and
   control, based on the received third user input, the display screen to display a second user interface (UI) indicating the second information about the first set of features of the second vehicle and at least a highlighted portion which notifies the user about the controlled first set of features of the first vehicle.

2. The electronic device according to claim 1, wherein the circuitry is further configured to:
   receive, from the selected first vehicle, a confirmation indicative of the control of the first set of features on the selected first vehicle, based on the received second user input; and
   control the haptic device associated with the electronic device to output a haptic feedback, based on the received confirmation.

3. The electronic device according to claim 1, wherein the first set of features of the selected first vehicle correspond to at least one of: an engine control feature, a door control feature, or a window control feature, a luggage compartment control feature, an infotainment control feature, or a heating ventilation and air-conditioning (HVAC) system control feature, associated with the selected first vehicle.

4. The electronic device according to claim 1, wherein the circuitry is further configured to:
   receive a fourth user input indicative of a time duration after which a started engine of the selected first vehicle is to be stopped; and
   control the selected first vehicle to stop the started engine of the selected first vehicle, based on the received fourth user input.

5. The electronic device according to claim 1, wherein the circuitry is further configured to:
   receive a fourth user input indicative of a time duration after which a stopped engine of the selected first vehicle is to be started; and
   control the selected first vehicle to start the stopped engine of the selected first vehicle, based on the received fourth user input.

6. The electronic device according to claim 1, wherein the circuitry is further configured to:
   receive a fourth user input indicative of a time duration after which a stopped HVAC system of the selected first vehicle is to be started; and
   control the selected first vehicle to start the stopped HVAC system of the selected first vehicle, based on the received fourth user input.

7. The electronic device according to claim 1, wherein the electronic device is a user wearable device.

8. The electronic device according to claim 1, wherein the circuitry is further configured to:
   receive a fourth user input indicative of an instruction to remotely control a second set of features on the selected first vehicle, wherein the second set of features correspond to at least one of: a head light control feature, a wiper control feature, a sunroof control feature, seat temperature control feature, or a horn control feature associated with the selected first vehicle; and
   control the second set of features on the selected first vehicle based on the received fourth user input.

9. The electronic device according to claim 1, wherein the circuitry is further configured to:
   receive, from the selected first vehicle, health status information associated with the selected first vehicle based on the received first user input; and
   control a display screen of the electronic device to display the received health status information associated with the selected first vehicle, wherein the received health status information includes at least one of: an engine parameter status, a vehicle-related alert, a tire pressure status, a vehicle range, odometer reading information, a fuel status, or an oil life, associated with the selected first vehicle.

10. The electronic device according to claim 9, wherein the vehicle-related alert includes one or more recommendations for the selected first vehicle, and wherein the one or more recommendations are associated with an operation and maintenance of the selected first vehicle.

11. The electronic device according to claim 9, wherein the fuel status indicates at least one of: an amount of fuel left in the selected first vehicle, a time duration for which an engine of the selected first vehicle is on, or a distance that can be covered by the selected first vehicle based on the amount of fuel left in the selected first vehicle.

12. The electronic device according to claim 1, wherein the circuitry is further configured to:
   receive vehicle identification information associated with each of the set of vehicles associated with the user; and
   control a display screen of the electronic device to display the received vehicle identification information associated with each of the set of vehicles, wherein the received vehicle identification information includes at least one of: a vehicle name, a vehicle manufacturer, a vehicle model, a vehicle color, a year of manufacture, or a vehicle registration number, associated with each of the set of vehicles.

13. The electronic device according to claim 1, wherein the circuitry is further configured to:
receive a fourth user input, via the second UI, to select one feature of the first set of features for the second vehicle; and
control the selected one feature of the first set of features on the second vehicle based on the fourth user input, received via the second UI.

14. A method, comprising:
in an electronic device:
receiving a first user input indicative of a selection of a first vehicle from a set of vehicles associated with a user;
receiving, via a haptic device associated with the electronic device, a second user input including a tactile gesture, wherein the second user input is indicative of an instruction to remotely control a first set of features on the selected first vehicle, and the tactile gesture includes a first swipe input along a first direction associated with the haptic device and includes a second swipe input along a second direction perpendicular to the first direction; and
controlling the first set of features on the selected first vehicle based on the received second user input;
controlling a display screen associated with the electronic device to display a first user interface (UI) indicating first information about the first set of features of the selected first vehicle, wherein the first set of features of the first vehicle are controlled based on a receipt of the second user input via the first UI;
receiving a third user input to display second information about a first set of features controlled on a second vehicle of the set of vehicles, wherein the second vehicle is different from the first vehicle; and
controlling, based on the received third user input, the display screen to display a second user interface (UI) indicating the second information about the first set of features of the second vehicle and at least a highlighted portion which notifies the user about the controlled first set of features of the first vehicle.

15. The method according to claim 14, wherein the first set of features of the selected first vehicle correspond to at least one of: an engine control feature, a door control feature, or a window control feature, a luggage compartment control feature, an infotainment control feature, or a heating ventilation and air-conditioning (HVAC) system control feature, associated with the selected first vehicle.

16. The method according to claim 14, further comprising:
receiving, from the selected first vehicle, a confirmation indicative of the control of the first set of features on the selected first vehicle, based on the received second user input; and
controlling the haptic device associated with the electronic device to output a haptic feedback, based on the received confirmation.

17. An electronic device, comprising:
circuitry configured to:
receive a first user input indicative of a selection of a first vehicle from a set of vehicles associated with a user;
control a display screen associated with the electronic device to display a first user interface (UI) indicating first information about a first set of features of the selected first vehicle;
receive a second user input, via the first UI, to remotely control the first set of features of the selected first vehicle;
receive a third user input to display second information about a first set of features controlled on a second vehicle of the set of vehicles, wherein the second vehicle is different from the first vehicle; and
control, based on the received third user input, the display screen to display a second user interface (UI) different from the first UI, indicating the second information about the first set of features of the second vehicle and at least a highlighted portion which notifies the user about the controlled first set of features of the first vehicle.

18. The electronic device according to claim 17, wherein the circuitry is further configured to:
receive a fourth user input, via the second UI, to select one feature of the first set of features for the second vehicle; and
control the selected one feature of the first set of features on the second vehicle based on the fourth user input, received via the second UI.

19. The electronic device according to claim 17, wherein the first set of features correspond to at least one of: an engine control feature, a door control feature, or a window control feature, a luggage compartment control feature, an infotainment control feature, or a heating ventilation and air-conditioning (HVAC) system control feature, associated with the selected first vehicle.

* * * * *